(12) United States Patent
Ishii et al.

(10) Patent No.: US 11,822,986 B2
(45) Date of Patent: Nov. 21, 2023

(54) READING APPARATUS, PROCESSING APPARATUS, AND IMAGE FORMING SYSTEM CONFIGURED TO CORRECT A REFERENCE IMAGE DETECTION POSITION

(71) Applicants: Tatsuya Ishii, Kanagawa (JP); Kohta Aoyagi, Kanagawa (JP); Kimiharu Yamazaki, Kanagawa (JP); Tohru Matsumoto, Kanagawa (JP); Satoshi Nakayama, Kanagawa (JP); Ryosuke Ebinuma, Tokyo (JP); Ryoh Ishitsuka, Kanagawa (JP)

(72) Inventors: Tatsuya Ishii, Kanagawa (JP); Kohta Aoyagi, Kanagawa (JP); Kimiharu Yamazaki, Kanagawa (JP); Tohru Matsumoto, Kanagawa (JP); Satoshi Nakayama, Kanagawa (JP); Ryosuke Ebinuma, Tokyo (JP); Ryoh Ishitsuka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/703,227

(22) Filed: Mar. 24, 2022

(65) Prior Publication Data
US 2022/0318582 A1 Oct. 6, 2022

(30) Foreign Application Priority Data
Mar. 30, 2021 (JP) .................................. 2021-057400

(51) Int. Cl.
*G06K 15/00* (2006.01)
*B41J 29/38* (2006.01)
(Continued)

(52) U.S. Cl.
CPC ............ *G06K 15/408* (2013.01); *B41J 29/38* (2013.01); *G06K 15/022* (2013.01);
(Continued)

(58) Field of Classification Search
None
See application file for complete search history.

(56) References Cited

U.S. PATENT DOCUMENTS

2011/0211899 A1* 9/2011 Teshigawara .......... B41J 11/663
　　　　　　　　　　　　　　　　　　　　　　400/621
2013/0258370 A1* 10/2013 Ikegami ............... H04N 1/3877
　　　　　　　　　　　　　　　　　　　　　　358/1.9

(Continued)

FOREIGN PATENT DOCUMENTS

| JP | H0598541 A | 4/1993 |
|---|---|---|
| JP | H10176997 A | 6/1998 |

(Continued)

OTHER PUBLICATIONS

Extended European Search Report dated Aug. 19, 2022 issued in corresponding European Appln. No. 22163464.5.

*Primary Examiner* — Dung D Tran
(74) *Attorney, Agent, or Firm* — Harness, Dickey & Pierce, P.L.C.

(57) ABSTRACT

A reading apparatus includes a reading device and circuitry. The reading device reads a recording medium in a direction intersecting a conveyance direction of the recording medium. The circuitry detects a reference image for cutting processing of the recording medium, based on read information read by the reading device.

20 Claims, 26 Drawing Sheets

(51) Int. Cl.
  *G06K 15/02* (2006.01)
  *H04N 1/00* (2006.01)
(52) U.S. Cl.
  CPC ......... *G06K 15/024* (2013.01); *G06K 15/403* (2013.01); *H04N 1/00037* (2013.01); *H04N 1/00092* (2013.01); *H04N 1/00676* (2013.01)

(56) References Cited

U.S. PATENT DOCUMENTS

| | | | |
|---|---|---|---|
| 2014/0036315 A1* | 2/2014 | Fukuda | G06K 15/1867 358/1.18 |
| 2014/0306395 A1* | 10/2014 | Suzuki | B65H 35/04 270/52.02 |
| 2014/0307019 A1* | 10/2014 | Muro | B41J 11/46 347/16 |
| 2015/0183214 A1* | 7/2015 | Yasuzaki | B41J 2/04505 347/9 |
| 2017/0274690 A1* | 9/2017 | Ukishima | B41J 29/393 |
| 2019/0061397 A1* | 2/2019 | Yago | B41J 29/38 |
| 2020/0099812 A1 | 3/2020 | Ishii | |
| 2020/0213476 A1 | 7/2020 | Tsuji | |
| 2020/0296243 A1 | 9/2020 | Aoyagi et al. | |
| 2020/0301326 A1 | 9/2020 | Yamazaki et al. | |

FOREIGN PATENT DOCUMENTS

| | | |
|---|---|---|
| JP | 2020-104357 | 7/2020 |
| WO | WO-2019/098063 A1 | 5/2019 |

\* cited by examiner

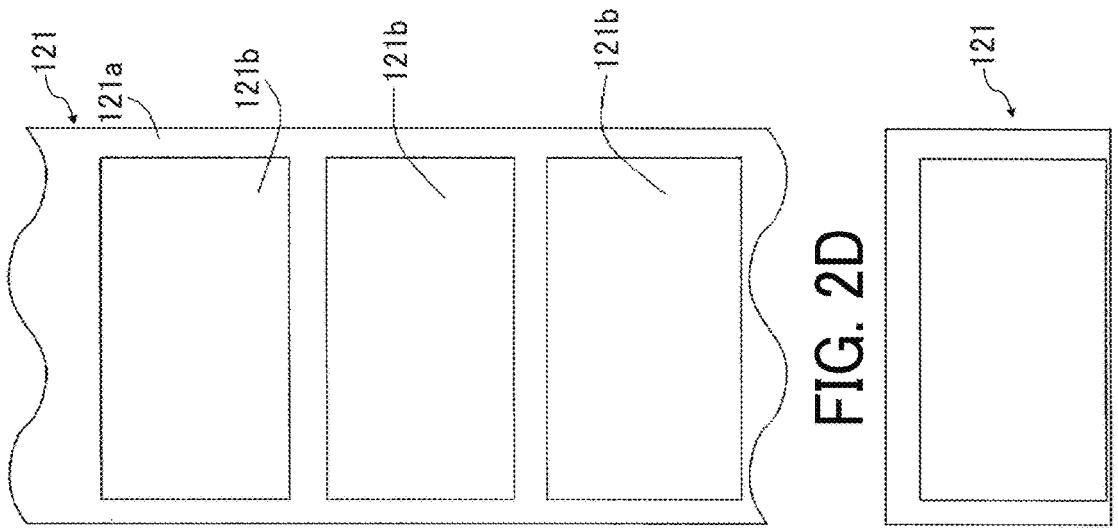
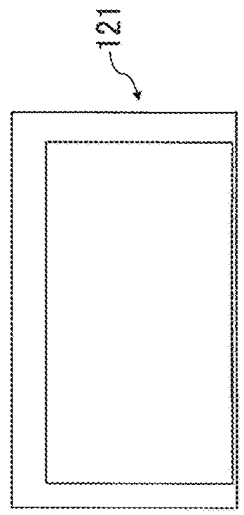
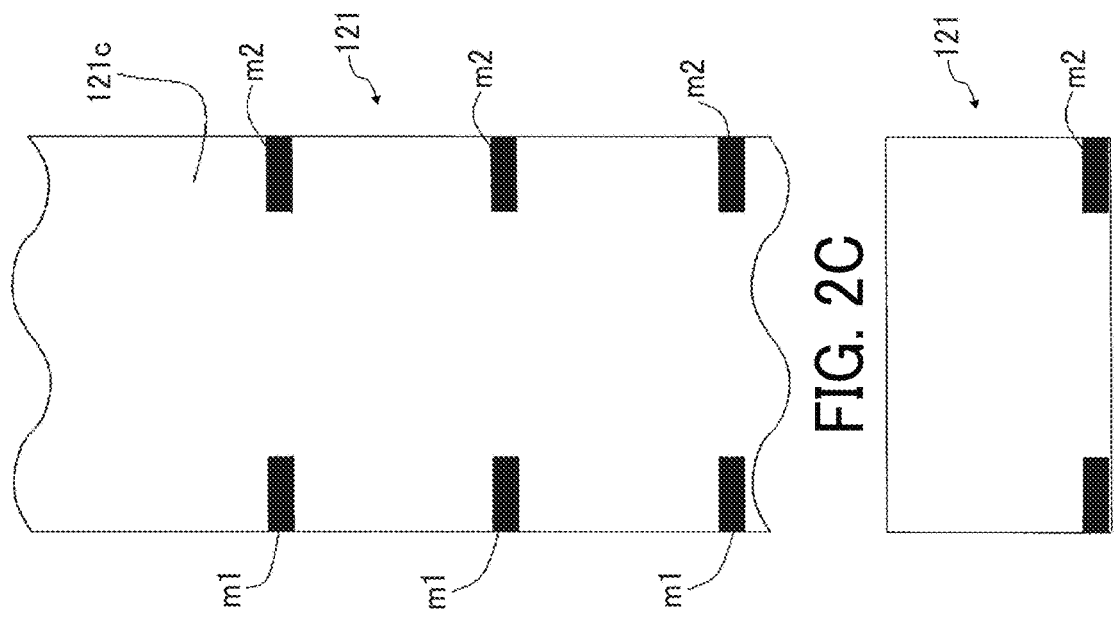
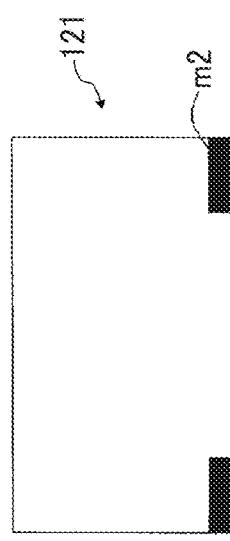

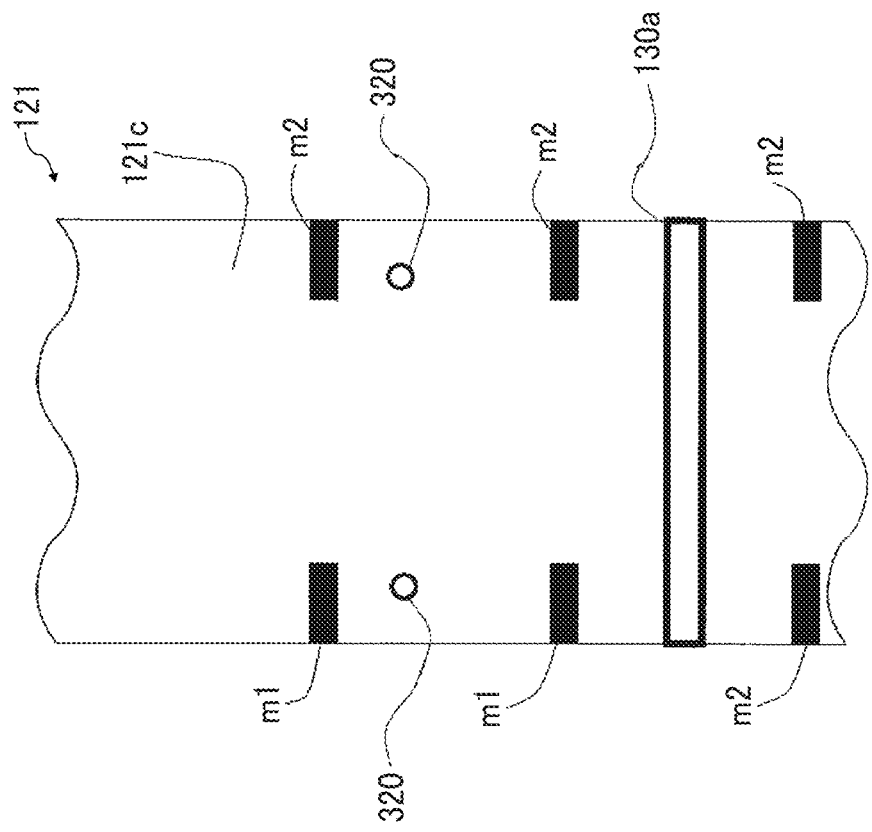
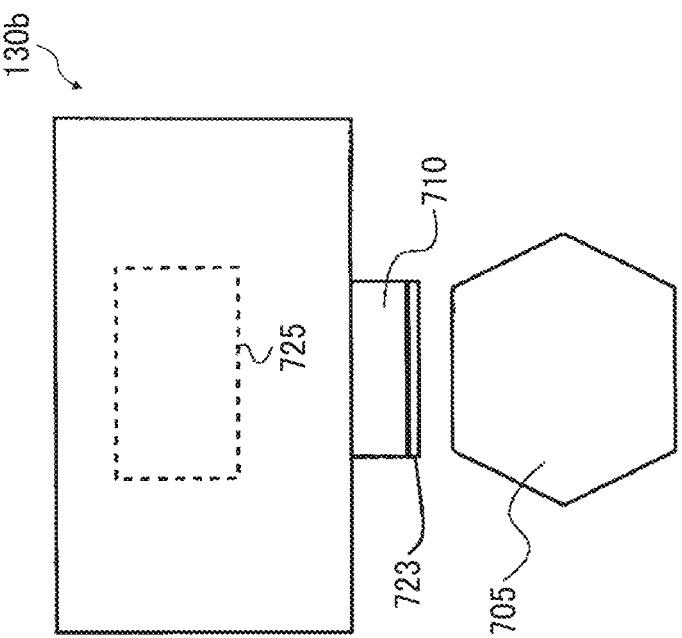

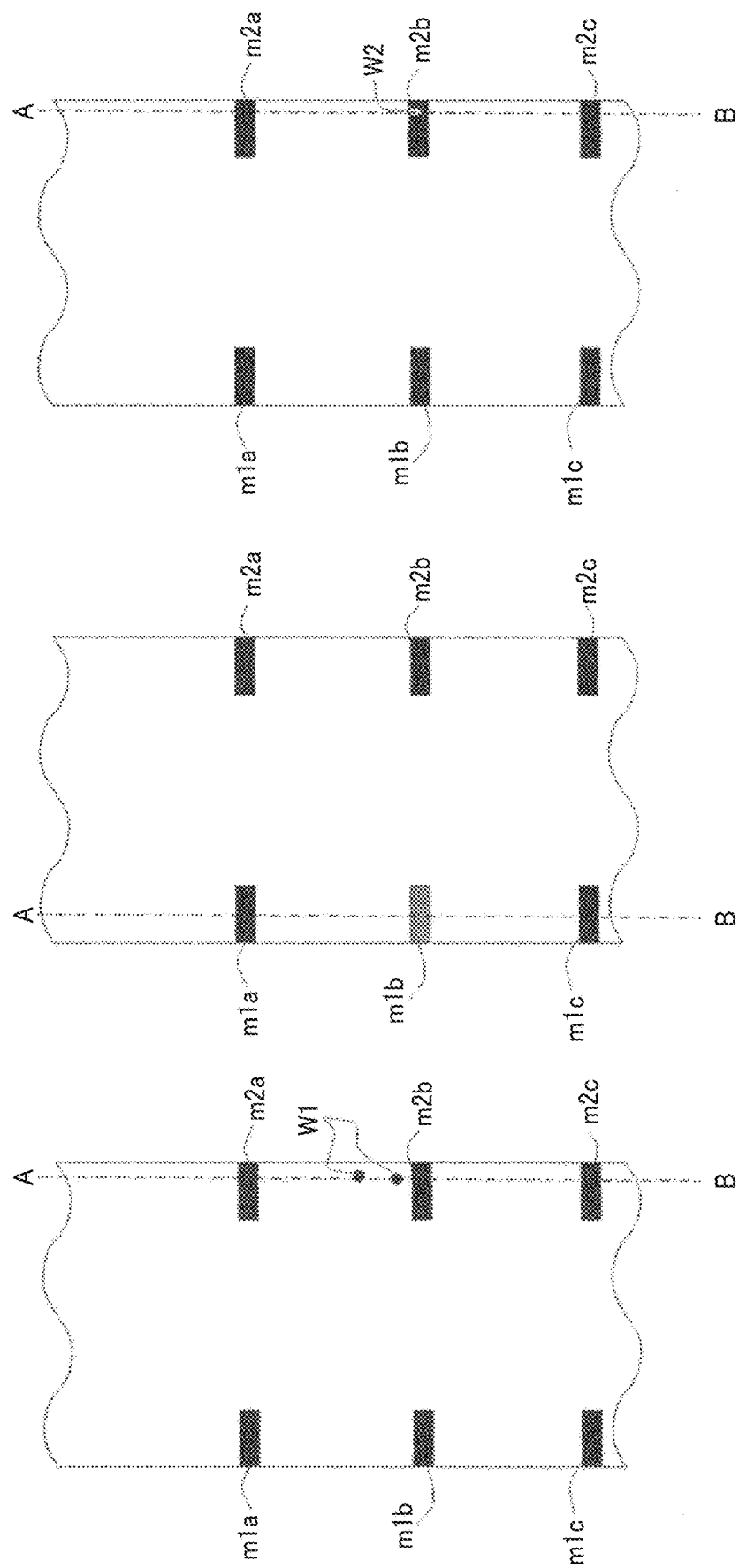

READING APPARATUS, PROCESSING APPARATUS, AND IMAGE FORMING SYSTEM CONFIGURED TO CORRECT A REFERENCE IMAGE DETECTION POSITION

CROSS-REFERENCE TO RELATED APPLICATION

This patent application is based on and claims priority pursuant to 35 U.S.C. § 119(a) to Japanese Patent Application No. 2021-057400, filed on Mar. 30, 2021, in the Japan Patent Office, the entire disclosure of which is hereby incorporated by reference herein.

BACKGROUND

Technical Field

Embodiments of the present disclosure relate to a reading apparatus, a processing apparatus, and an image forming system.

Related Art

A technology is known in which an image forming apparatus prints a label image and a reference image (for example, referred to as a cutting position mark or an eye mark) on a continuous sheet, a post-processing machine detects the reference image and cuts the continuous sheet to die-cut the label image.

However, when there is an abnormality in the reference image, there is a problem in that a defect occurs at a post-processing position in the post-processing machine.

SUMMARY

According to an embodiment of the present disclosure, there is provided a reading apparatus that includes a reading device and circuitry. The reading device reads a recording medium in a direction intersecting a conveyance direction of the recording medium. The circuitry detects a reference image for cutting processing of the recording medium, based on read information read by the reading device.

In another embodiment of the present disclosure, there is provided a processing apparatus that includes a sensor, circuitry, and a processing device. The sensor detects a reference image formed on a recording medium. The circuitry corrects a reference image detection result detected by the sensor. The processing device processes the recording medium at a predetermined position based on a result of correction by the circuitry.

In still another embodiment of the present disclosure, there is provided an image forming system that includes an image forming apparatus and a processing apparatus. The image forming apparatus forms an image on a recording medium. The reading apparatus is coupled to a downstream side of the image forming apparatus in a conveyance direction of the recording medium. The reading apparatus includes a reading device and first circuitry. The reading device reads the recording medium in a direction intersecting the conveyance direction of the recording medium. The first circuitry detects a reference image for cutting processing of the recording medium, based on read information read by the reading device. The processing apparatus is coupled to a downstream side of the reading apparatus in the conveyance direction. The processing apparatus includes a sensor, second circuitry, and a processing device. The sensor detects a reference image formed on a recording medium. The second circuitry corrects a reference image detection result detected by the sensor. The processing device processes the recording medium at a predetermined position based on a result of correction by the second circuitry. The second circuitry corrects the reference image detection result using a detection result output by the first circuitry. The processing apparatus cuts the recording medium at a predetermined position based on the result of the correction by the second circuitry.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIGS. 2A, 2B, 2C, and 2D are diagrams illustrating a continuous sheet according to an embodiment of the present disclosure.

FIGS. 3A and 3B are diagrams illustrating a reading device;

FIGS. 4A, 4B, and 4C are diagrams illustrating examples of abnormality of eye mark;

Figure 1:
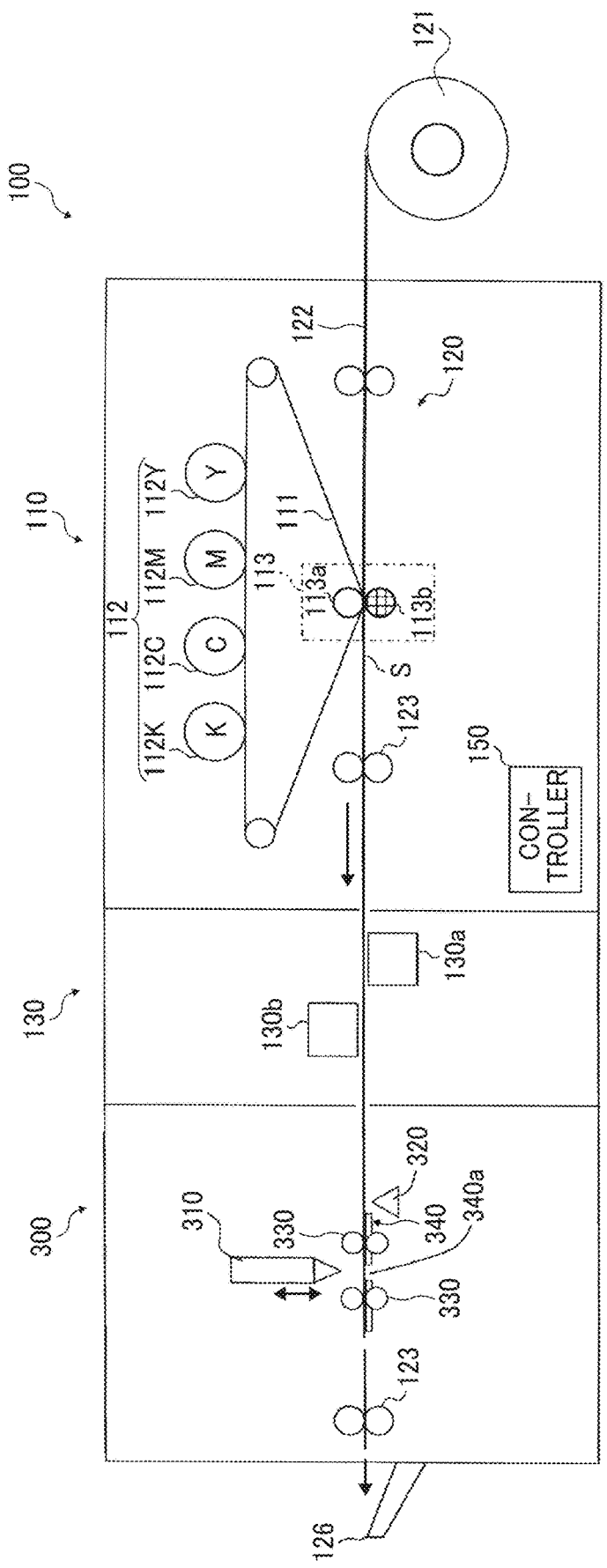
FIG. 1 is a diagram illustrating a schematic configuration of an image forming system according to an embodiment of the present disclosure.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Embodiments of the present disclosure are described in detail below with reference to the drawings. Note that the present invention is not to be considered limited to the following embodiments but can be changed within the range that can be conceived of by those skilled in the art, such as other embodiments, additions, modifications, deletions, and the scope of the present invention encompasses any aspect, as long as the aspect achieves the operation and advantageous effect of the present invention. Note that elements (for example, mechanical parts and components) having the same functions and shapes are denoted by the same reference numerals throughout the specification and redundant descriptions are omitted.

An image forming system according to an embodiment of the present disclosure includes at least a reading apparatus and a processing apparatus. A reading apparatus is disposed upstream from a processing apparatus in a conveyance direction of a recording medium and detects an abnormality of a reference image (hereinafter referred to as an "eye mark") by reading processing and corrects a detection result obtained by detecting the eye mark by detection processing. The processing apparatus is disposed downstream from the reading apparatus in the conveyance direction and performs processing based on the corrected result.

The eye mark is an image used for processing of the recording medium and is, for example, an image indicating a position serving as a reference in predetermined processing (as an example, a cutting position mark indicating the position of cutting).

Hereinafter, each embodiment is described with reference to the drawings.

First Embodiment

First, an image forming system according to an embodiment of the present disclosure is described.

FIG. 1 is a schematic configuration diagram illustrating an image forming system 100 according to an embodiment of the present disclosure.

The image forming system 100 includes at least an image forming unit 110 serving as an image forming apparatus, an image reading unit 130 serving as a reading apparatus (also referred to as an "inspection apparatus"), and a cutting unit 300 serving as a processing apparatus (also referred to as a "post-processing machine").

The image reading unit 130 is connected to the downstream side of the image forming unit 110 in the conveyance direction. The cutting unit 300 is connected to the downstream side of the image reading unit 130 in the conveyance direction.

The image forming system 100 further includes a medium conveyor 120 and a controller 150.

FIG. 1 illustrates a state in which a continuous sheet of paper (hereinafter, continuous sheet) 121 is loaded in the image forming system 100. In the following description, a direction intersecting the conveyance direction of the continuous sheet 121 is referred to as a main scanning direction, and the conveyance direction is referred to as a sub-scanning direction. In addition, in the continuous sheet 121, a direction parallel to the conveyance direction is also referred to as a "longitudinal direction", and a direction intersecting the conveyance direction is also referred to as a "width direction".

Image Forming Unit

The image forming unit 110 illustrated in FIG. 1 includes photoconductor drums 112 for forming latent images corresponding to images of respective colors. To be more specific, the photoconductor drums 112 are the photoconductor drums 112Y, 112M, 112C, and 112K disposed so as to correspond to an image forming processes using toners of yellow (Y), magenta (M), cyan (C), and black (K), which are image forming materials (for example, toners) of the respective colors.

The photoconductor drums 112Y, 112M, 112C, and 112K are disposed along an intermediate transfer belt 111 that is an endless belt included in a movement assembly.

The intermediate transfer belt 111 is wound around at least one drive roller and a plurality of driven rollers, and moves between a primary transfer position where an image (toner image) developed on the photoconductor drum 112 (i.e., photoconductor drums 112Y, 112M, 112C, and 112K) is transferred and a secondary transfer position where the image (toner image) is transferred to the continuous sheet 121.

A transfer device 113 is disposed at the secondary transfer position. The transfer device 113 includes a transfer roller 113a and a counter roller 113b that is disposed facing the transfer roller 113a. In the transfer device 113, the toner image is transferred from the intermediate transfer belt 111 to the continuous sheet 121 to form an image at a predetermined position (i.e., image forming position) on the continuous sheet 121. A gap is provided between the transfer roller 113a and the counter roller 113b such that the intermediate transfer belt 111 and the continuous sheet 121 pass through the gap while being nipped between the transfer roller 113a and the counter roller 113b. An image is transferred to a first surface (upper surface in FIG. 1) of the continuous sheet 121 while the continuous sheet 121 is sandwiched in the gap and conveyed in the conveyance direction.

The medium conveyor 120 includes a supply unit, a conveyance passage 122, and a fixing roller pair 123. The supply unit accommodates the continuous sheet 121. The conveyance passage 122 is defined by multiple roller pairs to convey the continuous sheet 121. The fixing roller pair 123 is disposed downstream from the transfer device 113 in the conveyance direction of the continuous sheet 121.

FIGS. 2A to 2D are diagrams illustrating an example of the continuous sheet 121. FIG. 2A illustrates a back surface of the continuous sheet 121. FIG. 2B illustrates a front surface of the continuous sheet 121. FIG. 2C illustrates a back surface of a label after cutting. FIG. 2D illustrates a front surface of the label after cutting.

As illustrated in FIG. 2B, on the front surface of the continuous sheet 121, label portions 121b are disposed on a base material 121a.

The label portions 121b are arranged at predetermined intervals along the conveyance direction of the continuous sheet 121. The label portion 121b has an adhesive surface and is stuck to the base material 121a. The label portion 121b is not limited to this form, and may be, for example, an image forming region of the base material 121a. The label portion 121b may be, for example, an image forming region in which a part of the base material 121a is distinguished by a different color or the like.

The label portion 121b is conveyed with its surface facing upward in FIG. 1, and an image is formed on the surface of the label portion 121b by the image forming unit 110. As illustrated in FIG. 2A, eye marks m1 and m2 are disposed on the back surface of the continuous sheet 121. Hereinafter, the eye marks m1 and m2 may be referred to as "eye mark m" or "eye marks m" unless distinguished from each other.

The eye mark m is a position reference used by the cutting unit 300 to perform alignment when the cutting unit 300 cuts the continuous sheet 121.

The eye mark m is an example of a reference image, and is also referred to as an eye mark, a black mark, or a timing mark.

The eye marks m1 and m2 are disposed on both sides of the continuous sheet 121 in the width direction. FIG. 2B illustrates an example in which the eye marks m are disposed on the regions of the back surface corresponding to the label portions 121b.

In the image forming system 100 of FIG. 1 according to the present embodiment, it is assumed that eye marks m are printed in advance on the continuous sheet 121 set in the supply unit when an image is formed on the base material 121a of the continuous sheet 121.

When the image forming process is performed, under the predetermined control process by the controller 150, the continuous sheet 121 loaded in the supply unit is separated by, e.g., a pickup roller and conveyed along the conveyance passage 122. Then, the continuous sheet 121 reaches the transfer device 113.

As the continuous sheet 121 reaches the transfer device 113, the transfer process is performed. That is, the continuous sheet 121 is conveyed in the predetermined conveyance direction of the continuous sheet 121 while being nipped between the surface of the intermediate transfer belt 111 and the counter roller 113b. The transfer roller 113a biases (presses) the intermediate transfer belt 111 toward the counter roller 113b. When the continuous sheet 121 passes between the intermediate transfer belt 111 and the counter roller 113b, an image forming material on the surface of the intermediate transfer belt 111 is transferred onto the label portion 121b of the continuous sheet 121. In this transfer process, an image is formed on the label portion 121b of the continuous sheet 121.

The continuous sheet 121 having the image on the label portion 121b is further conveyed, and the image on the label portion 121b of the continuous sheet 121 is fixed by the fixing roller pair 123. Then, the continuous sheet 121 is conveyed to the image reading unit 130 disposed downstream from the fixing roller pair 123 in the conveyance direction of the continuous sheet 121.

<Image Reading Unit>

The image reading unit 130 includes a reading device 130a that reads an image of the eye mark m on the back surface of the continuous sheet 121 and a reading device 130b that reads an image of the label portion 121b of the continuous sheet 121.

FIGS. 3A and 3B are diagrams illustrating the reading devices. FIG. 3A is a diagram illustrating a configuration example of the reading device 130b. FIG. 3B is a diagram illustrating the arrangement positions (reading positions) of the reading device 130a and mark sensors 320.

As illustrated in FIG. 3A, the reading device 130b includes an irradiator 710 and a line image sensor. The irradiator 710 irradiates the continuous sheet 121 passing through the reading position with light such as an LED. The line image sensor includes a plurality of imaging elements 725 that are one dimensionally arranged in the width direction of the sheet to perform photoelectric conversion for each pixel. Each imaging element outputs a signal corresponding to the intensity of light emitted from a light source and reflected by the surface of the sheet. The line image sensor may be, e.g., a complementary metal oxide semiconductor (CMOS) sensor or a charge-coupled device (CCD) sensor. The reading device 130b repeatedly performs a reading operation of an image for one line extending in the width direction in accordance with a passing operation of the continuous sheet 121 that passes the reading position, so as to read the image printed on the continuous sheet 121 as a two-dimensional image.

Each of the multiple imaging elements 725 is an optical sensor that performs a reading operation on an image formed on the continuous sheet 121 at the reading position.

The background switching revolver 705 is disposed at a position facing the reading device 130b across the conveyance passage 122 to reflect irradiation light with which the continuous sheet 121 is irradiated when the image on the continuous sheet 121 is read.

The reading device 130b includes an exposure glass 723 disposed facing the background switching revolver 705. The exposure glass 723 penetrates light emitted from the irradiator 710 and reflected light returning after the emitted light is reflected by the background switching revolver 705 or the sheet S.

The reading device 130a has the same configuration as that of the reading device 130b illustrated in FIG. 3A. The background switching revolver 705 is disposed above the conveyance passage 122, and the irradiator 710 and the imaging element 725 are disposed below the conveyance passage 122.

The continuous sheet 121 that has passed through the image reading unit 130 is cut by predetermined lengths by the cutting unit 300 (FIGS. 2C and 2D) and is ejected to an ejection tray 126.

Cutting Unit

The cutting unit 300 includes a cutter 310, mark sensors 320, a conveyance roller 330, and a conveyance guide 340.

The mark sensor 320 is a point-type reflection sensor or a transmission sensor and receives an electric signal corresponding to a brightness difference between the background color of the continuous sheet 121 and the eye mark m. When the received electric signal has a signal level lower than a threshold (detection reference value), the controller 150 determines that the eye mark m is present.

As illustrated in FIG. 3B, the reading device 130a and the mark sensor 320 are different in the detection width in the main scanning direction. The reading device 130a detects the entire area in the main scanning direction, and each mark sensor 320 detects a predetermined position in the main scanning direction.

The cutting unit 300 detects the eye marks m on the continuous sheet 121 with the mark sensors 320, and presses the cutter 310 against the continuous sheet 121 at a predetermined position based on the detected eye marks m. The cutter 310 moves in the vertical direction in FIG. 1 and enters the hole 340a of the conveyance guide 340 to cut the continuous sheet 121 into predetermined lengths (i.e., die-cut the label image).

Controller

The controller 150 controls the entire operation of the image forming system 100, and controls a series of processes for forming an image on a continuous sheet 121, which is a roll-shaped recording medium.

The controller 150 includes, for example, a central processing unit (CPU), a read only memory (ROM), and a random access memory (RAM). The CPU controls each unit of the image forming system 100 based on a program stored in the ROM while using the RAM as a working memory to execute basic processing as the image forming system 100.

In addition, each of the image forming unit 110, the image reading unit 130, and the cutting unit 300 may be controlled by, for example, the controller 150. Alternatively, each of the image forming unit 110, the image reading unit 130, and the cutting unit 300 may further include an individual controller. In this case, the controller 150 may be a main controller, and the individual controllers may operate based on the control of the controller 150.

The outline of the configuration example of the image forming system 100 has been described above.

Next, the abnormality of the eye mark is described.

FIGS. 4A, 4B, and 4C are diagrams illustrating examples of abnormalities (or defects) of eye marks. FIGS. 4A, 4B, and 4C illustrate examples in which eye marks m1a, m1b, and m1c and m2a, m2b, and m2c are formed on a back surface 121c of the continuous sheet 121. FIG. 4A illustrates an example in which a stain W1 is present between the eye marks. FIG. 4B illustrates an example in which the color of the eye mark m1b is light. FIG. 4C illustrates an example in which a stain W2 is present on the eye mark m2b.

Figure 5A:
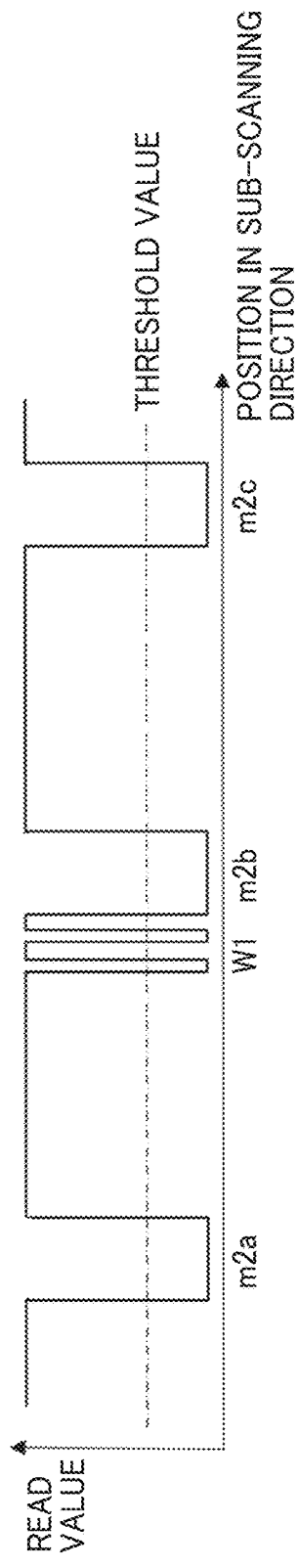
FIGS. 5A, 5B, and 5C are diagrams illustrating outputs of read values of a reading device on lines A-B illustrated in FIGS. 4A, 4B, and 4C.
Figure 5B:
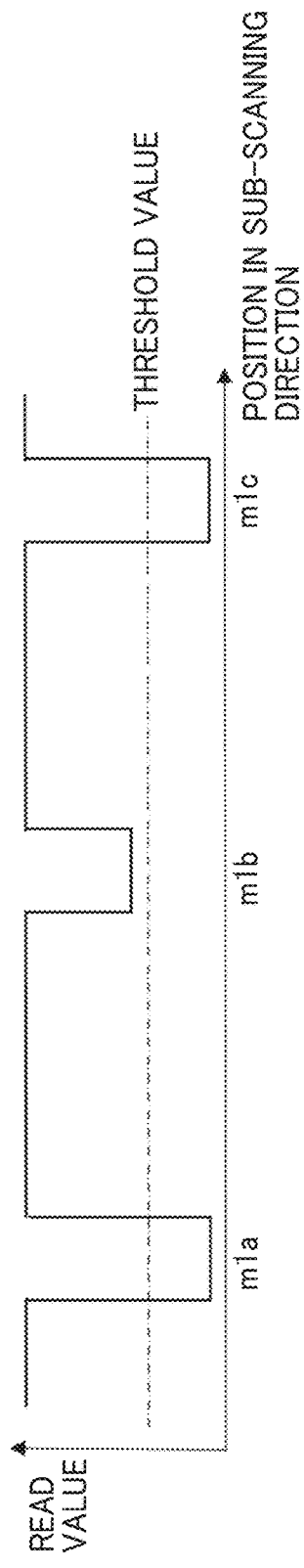
Figure 5C:
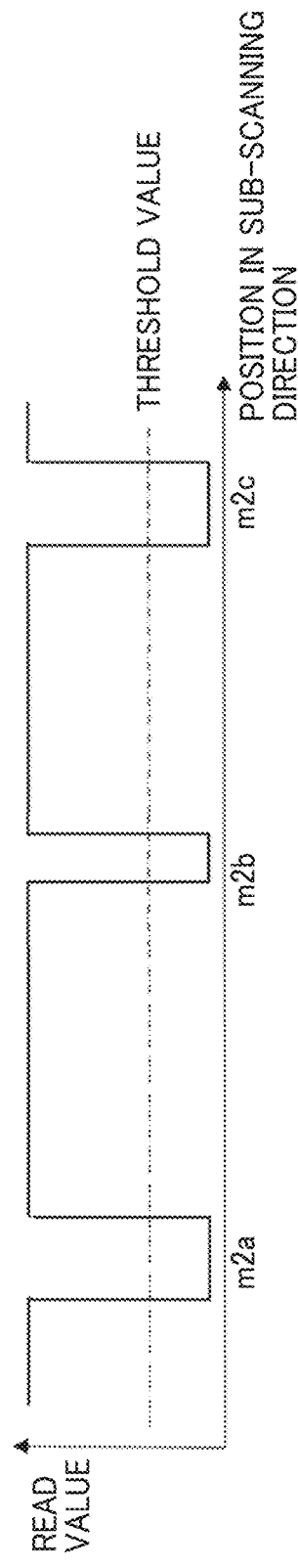

FIGS. 5A, 5B, and 5C are diagrams illustrating outputs of read values of the reading device 130a in lines A-B illustrated in FIGS. 4A, 4B, and 4C.

In the description of FIGS. 4A, 4B, and 4C and FIGS. 5A, 5B, and 5C, it is assumed that when the position of the mark sensor 320 in the main scanning direction is arranged on the line A-B in each of FIGS. 4A, 4B, and 4C, the mark sensor 320 obtains an output value whose size changes (height difference occurs) in the same manner as the read value of the reading device 130a. It is assumed that the mark sensor 320 and the reading device 130a are located on the line A-B. The line A-B is at the same position in the main scanning direction (the same main scanning position as that of the mark sensor 320. However, there is a possibility that the relationship between the line image sensor and the mark sensor 320 may shift in the main scanning direction due to, for example, a shift of a continuous sheet in the main scanning direction during sheet conveyance or a positional shift between the reading device 130a and the cutting unit 300. For this reason, the reading device 130a may perform reading at a plurality of main scanning positions in addition to the line A-B to perform abnormality determination.

The line image sensor in the reading device 130a can obtain read images of three colors of red, green, and blue (RGB). In the case of a black eye mark on a white background color, an equivalent value is obtained in each output of R, G, and B. For this reason, any color of R, G, and B may be used as the detection color of the reading device 130a. The detection color is information for specifying (selecting) a color to be read (detected) by the reading device 130a.

The RGB values of the device-dependent color system may be changed to the L*a*b* values of the non-device-dependent color system using the color profile (scanner profile) of the image reading unit. The RGB values in the reading device 130a are converted into L*a*b* values, XYZ-values, and the like using the scanner profile, thus allowing gradation correction to be performed based on device-independent absolute calculation.

FIG. 4A illustrates an example in which stain W1 due to toner adheres to the vicinity of the eye mark m2b.

For example, it is assumed that when the eye mark m2b is formed on the continuous sheet 121, toner may adhere to the continuous sheet 121 as stain W1 or in FIG. 1, residual toner adhering to the counter roller 113b may adhere to the continuous sheet 121 as stain W1.

At this time, the output of the read value of the reading device 130a in the line A-B of FIG. 4A is as illustrated in FIG. 5A. As indicated by the eye marks m2a, m2b, and m2c, a normal eye mark is black, and accordingly a read value at a level lower than the threshold value is obtained in predetermined ranges in the sub-scanning direction.

On the other hand, when the stain W1 is black toner, the read value lower than the threshold value is obtained as in the case of the eye marks m2a, m2b, and m2c. However, the range of the read value in the sub-scanning direction is smaller than the range of the read value in the case of the eye marks m2a, m2b, and m2c.

The read value of the stain W1 is the same as each of the eye marks m2a, m2b, and m2c. If the mark sensor 320 of the cutting unit 300 detects the stain W1 as a mark, the continuous sheet 121 is cut at an erroneous position (position of stain W1).

FIG. 4B illustrates an example in which the color of the eye mark m1b is formed to be lighter than the color of each of the eye marks m1a and m1c.

At this time, the output of the read value of the reading device 130a in the line A-B of FIG. 4B is as illustrated in FIG. 5B. As indicated by the eye marks m1a and m1c, a normal eye mark is black, and accordingly a read value at a level lower than the threshold value is obtained in predetermined ranges in the sub-scanning direction.

On the other hand, when the color of the eye mark m1b is light, the read value of the reading device 130a does not fall below the threshold value. Since the mark sensor 320 of the cutting unit 300 cannot detect the eye mark m1b as a mark, there is a possibility that cutting might not be performed at the position of the eye mark m1b.

FIG. 4C illustrates an example in which a bright stain such as a white toner stain W2 is attached to the eye mark m2b.

For example, it is assumed that when the eye mark m2b is formed on the continuous sheet 121, white toner adheres to the area of the eye mark m2b as the stain W2, or in FIG. 1, residual white toner adhering to the counter roller 113b adheres to the eye mark m2b as the stain W2.

At this time, the output of the read value of the reading device 130a in the line A-B of FIG. 4C is as illustrated in FIG. 5C. As indicated by the eye marks m2a, m2b, and m2c, a normal eye mark is black, and accordingly a read value at a level lower than the threshold value is obtained in predetermined ranges in the sub-scanning direction.

On the other hand, as illustrated in FIG. 4C, when bright stain such as stain W2 is attached to the eye mark m2b, the stained portion appears bright in the eye mark m2b. Accordingly, as indicated by a mark 2 at the time of abnormality in FIG. 5C, the output value of the portion of the stain W2 exceeds the threshold value. Therefore, the size of the eye mark m2b is reduced by the size of the stain W2. The mark sensor 320 of the cutting unit 300 cannot correctly detect the eye mark m2b as a mark.

Note that the above-described abnormality of the eye mark is not limited to toner and may be contamination of ink, light printing of an eye mark, or the like.

As described above, if there is an abnormality in the eye mark m, a failure occurs in the processing apparatus. Accordingly, it is desirable that the reading apparatus detect the abnormality of the eye mark and output the detection result.

Therefore, in the present embodiment, the image reading unit 130 disposed upstream from the cutting unit 300 detects the abnormality of the eye mark m, outputs the detection result, and notifies the abnormality of the eye mark.

Figure 6:
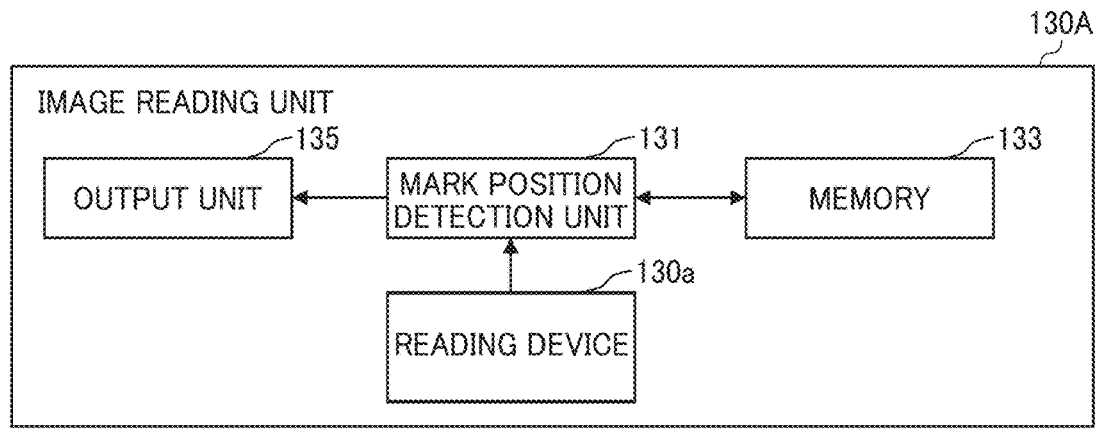
FIG. 6 is a block diagram illustrating a functional configuration of an image reading unit according to a first embodiment of the present disclosure.
Figure 7:
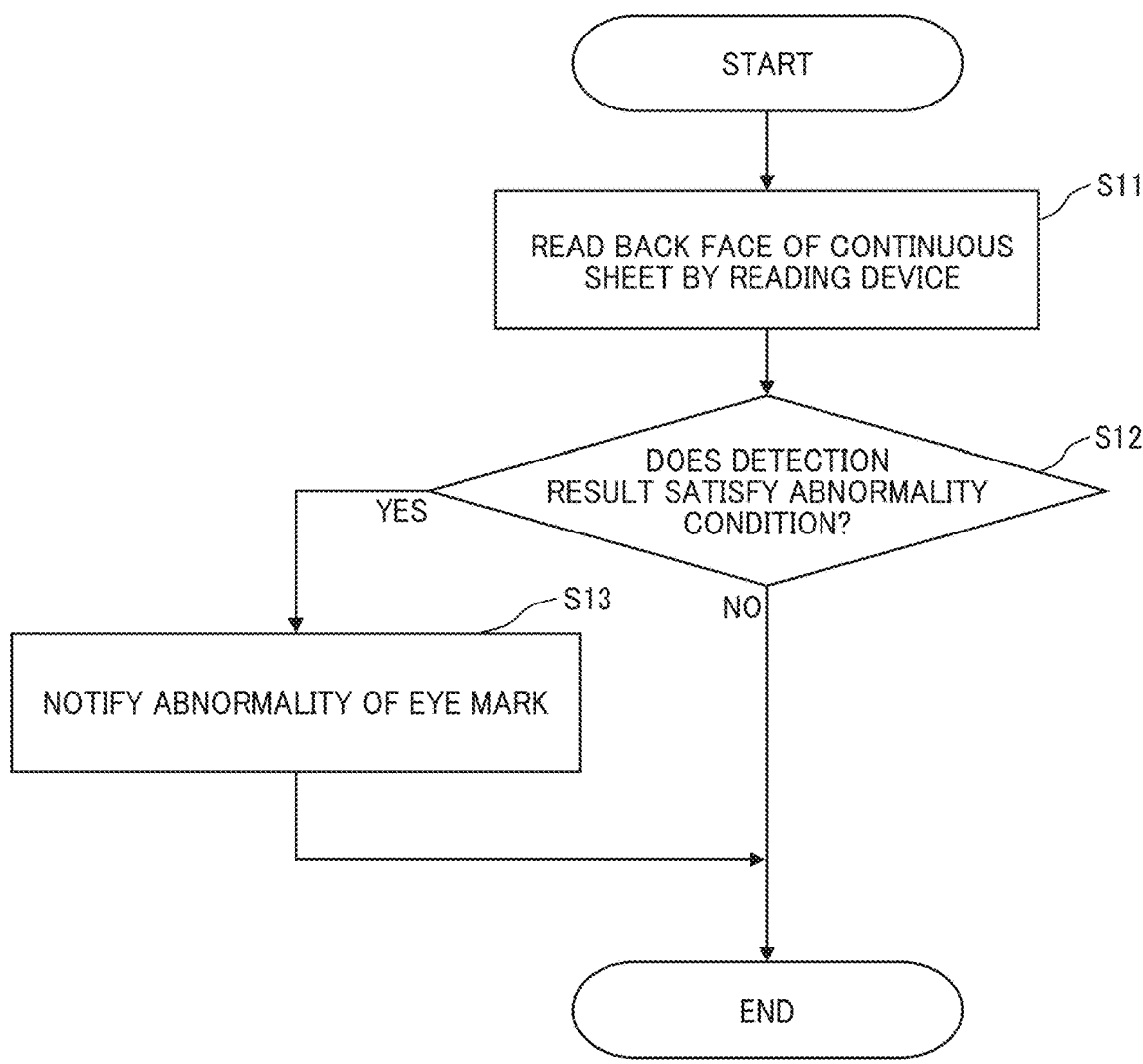
FIG. 7 is a flowchart illustrating an operation example of abnormality determination of eye marks.

FIG. 6 is a block diagram illustrating a functional example in which an image reading unit 130A according to the first embodiment detects and outputs an abnormality of an eye mark. FIG. 7 is a flowchart illustrating an operation example of the abnormality determination of the eye mark.

The image reading unit 130A includes a reading device 130a, a mark position detection unit 131, a memory 133, and an output unit 135.

The reading device 130a reads the continuous sheet 121 as a recording medium.

The mark position detection unit 131 serving as a detector detects eye marks m from read information read by the reading device 130a (read values at respective positions in the main scanning direction, for example, read values on the line A-B illustrated in FIGS. 5A, 5B, and 5C). The mark position detection unit 131 detects, for example, the position of an eye mark m and determines whether the detected eye mark is abnormal.

The memory 133 is a storage area in which information used for abnormality determination of an eye mark is recorded in advance. The memory 133 holds, for example, information relating to the positions of the plurality of eye marks m in the sub-scanning direction and a threshold value illustrated in FIGS. 5A, 5B, and 5C. The information on the positions in the sub-scanning direction is, for example, an interval in the sub-scanning direction between adjacent eye marks m (also referred to as a "sub-scanning distance"). The information stored in the memory 133 may be information on the eye marks m of the continuous sheet 121 accommodated in the supply unit (for example, information on the positions of the eye marks m in the sub-scanning direction, the threshold value, and the shape of the eye marks). The memory 133 may hold information related to the positions of the plurality of eye marks m in the main scanning direction and a threshold value.

The output unit 135 outputs the detection result of the mark position detection unit 131. For example, when the abnormality of the eye mark is notified from the mark position detection unit 131, the output unit 135 outputs information regarding the abnormality of the eye mark to a predetermined output destination (a display unit of the apparatus, a notification to a terminal of a user, the cutting unit 300, or the like). The output method may be a method of outputting information to an output destination in a wired manner or a method of outputting information to an output destination wirelessly.

Next, an operation example in which the image reading unit 130A according to the present embodiment determines abnormality of an eye mark is described with reference to FIG. 7.

When the continuous sheet 121 passes through the reading device 130a, the reading device 130a reads the back surface 121c of the continuous sheet 121 and generates read information (step S11).

Specifically, the reading device 130a optically scans the back surface 121c of the continuous sheet 121, forms an image of light reflected from the continuous sheet 121 on the light receiving surface of the line sensor, reads the image (eye mark m) of the continuous sheet 121, and generates read information (read image information) of the eye mark m based on the read result.

The reading device 130a sends (outputs) the read information to the mark position detecting unit 131.

The mark position detection unit 131 grasps an ideal position of the eye mark m based on print information such as the shape of the eye mark m, the size of the label portion 121b in the conveyance direction, and the size of the label portion 121b in the direction orthogonal to the conveyance direction, and performs abnormality condition determination on the position or a peripheral region including the ideal position. The print information is stored in a memory in advance.

Next, the mark position detection unit 131 determines whether the eye mark m read by the reading device 130a satisfies an abnormality condition (step S12).

For example, when the read value of an eye mark m read by the reading device 130a satisfies the determination method illustrated in Table 1, the mark position detection unit 131 determines that the eye mark m is abnormal.

Table 1 illustrates an example of the type of abnormality of an eye mark and a determination method. Here, the sub-scanning distance and the threshold value of the normal eye marks m in FIGS. 5A, 5B, and 5C are set in advance in the memory 133.

TABLE 1

| Type of Abnormality | Determination Method |
|---|---|
| Light color of eye mark | When a read value in an area of eye mark is greater than a threshold value |
| Black toner dropping | When a read value in an area other than eye marks is lower than a threshold value |
| White toner dropping | When a read value in an area of eye mark is greater than a threshold value |

<Light Color of Eye Mark>

The eye mark m is generally printed in black and is detected by the mark sensor 320 (reflective sensor). However, if the black is light, the eye mark m cannot be detected and may be erroneously detected. Therefore, when the eye mark is detected at a certain brightness or more, the mark position detection unit 131 determines that it is erroneous detection (determines that it is not an eye mark). For example, this is the case of the eye mark m1b illustrated in FIGS. 4B and 5B.

<Black Toner Dropping>

The back surface 121c of the continuous sheet 121 has the background color of the continuous sheet except for the eye mark m, but may be dark due to contamination such as toner dropping. Therefore, when there is an area below the threshold value, the mark position detection unit 131 determines that there is contamination such as toner dropping. For example, this is the case where there is a stain W1 near the eye mark m2b as illustrated in FIGS. 4A and 5A.

<White Toner Dropping>

For example, bright dust may be attached to an area where an eye mark m of a dark color is formed and the eye mark m may not be detected, which also causes a problem. Since erroneous detection occurs when the read value exceeds the threshold value and does not appear dark, the mark position detection unit 131 determines that the eye mark is abnormal. For example, this is the case of the eye mark m2b illustrated in FIGS. 4C and 5C.

In a case where the mark position detection unit 131 determines that the eye mark m is abnormal (YES in step S12), the mark position detection unit 131 stores information of the abnormal eye mark in the memory 133. This information includes, for example, the position of an abnormal eye mark (information on whether the position is left or right in the main scanning direction with respect to the conveyance direction or what number the position is from a predetermined position with respect to the conveyance direction), a read value exceeding a threshold value at the position of the eye mark (e.g., the eye mark m1b in FIG. 4B), and a read value below the threshold value at a position other than the ideal position of the eye mark (e.g., the stain W1 in FIG. 4A). The output unit 135 notifies that the eye mark is abnormal and the information of the abnormal eye mark (step S13).

The output unit 135 outputs and displays the abnormality of the eye mark on, for example, a display unit of the apparatus or a terminal of the user (step S13). When there is no abnormality in the eye mark (NO in step S12), the processing is ended.

In this manner, according to the present embodiment, the presence or absence of an abnormality of an eye mark can be detected based on the reading result of the reading device 130a.

In the present embodiment, instead of outputting the acquired information, the output unit 135 may notify the output destination to refer to the acquired information stored in the memory 133.

Alternatively, the output unit 135 may output the output information received from the mark position detection unit 131 to an output destination without the mark position detection unit 131 storing the acquired information in the memory 133.

Second Embodiment

A second embodiment of the present disclosure is described with reference to FIGS. 8 to 10. The configuration of an image forming system 100 according to the second embodiment is the same as that of the first embodiment.

In the present embodiment, an example is described in which an abnormality of an eye mark is detected by an image reading unit 130B disposed upstream from a cutting unit 300B in a conveyance direction of a recording medium, a detection result (reference image detection result) of the eye mark detected by a mark sensor 320 is corrected by the cutting unit 300B disposed downstream from the image reading unit 130B in the conveyance direction, and processing is performed based on the corrected result. More specifically, when there is an abnormality in the eye mark or the periphery of the eye mark is stained, the cutting unit 300B estimates the mark position in the second embodiment.

Figure 8:
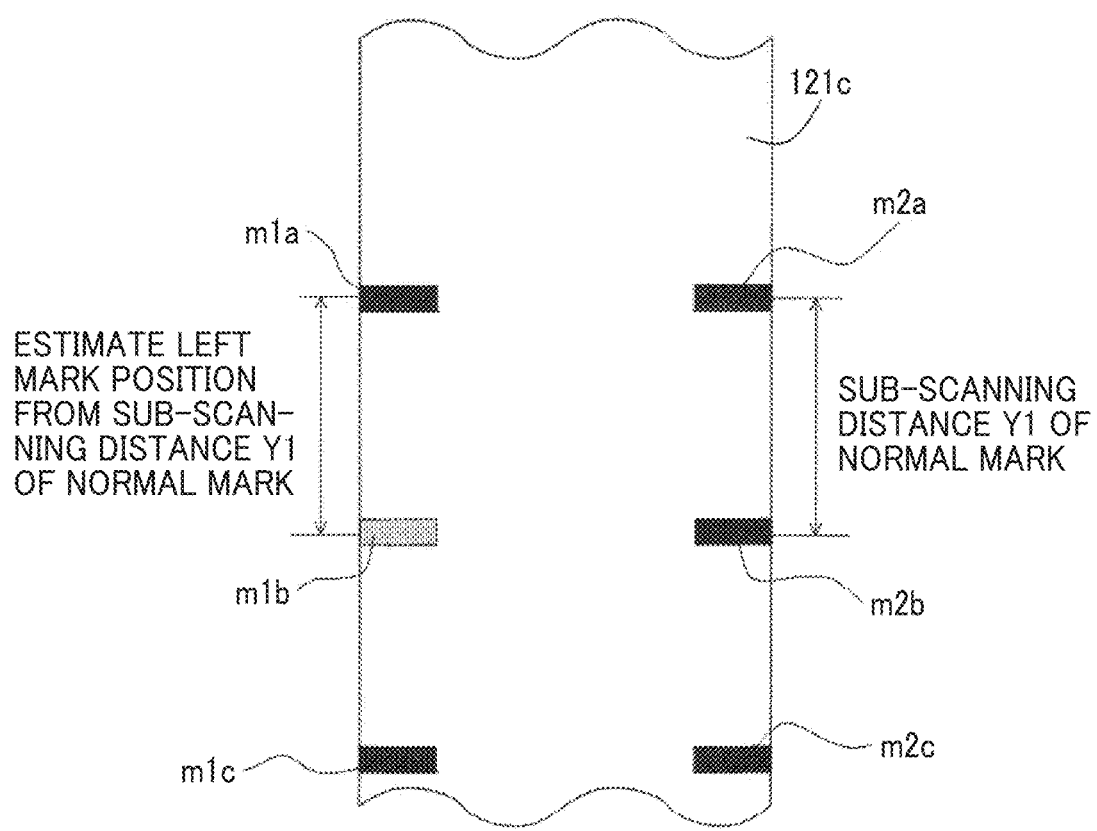
FIG. 8 is a schematic diagram illustrating an example of a continuous sheet on which an eye mark whose color is light is formed as an image.

FIG. 8 is a schematic diagram illustrating an example of a continuous sheet 121 on which an eye mark whose color is light is formed as an image.

Figure 9:
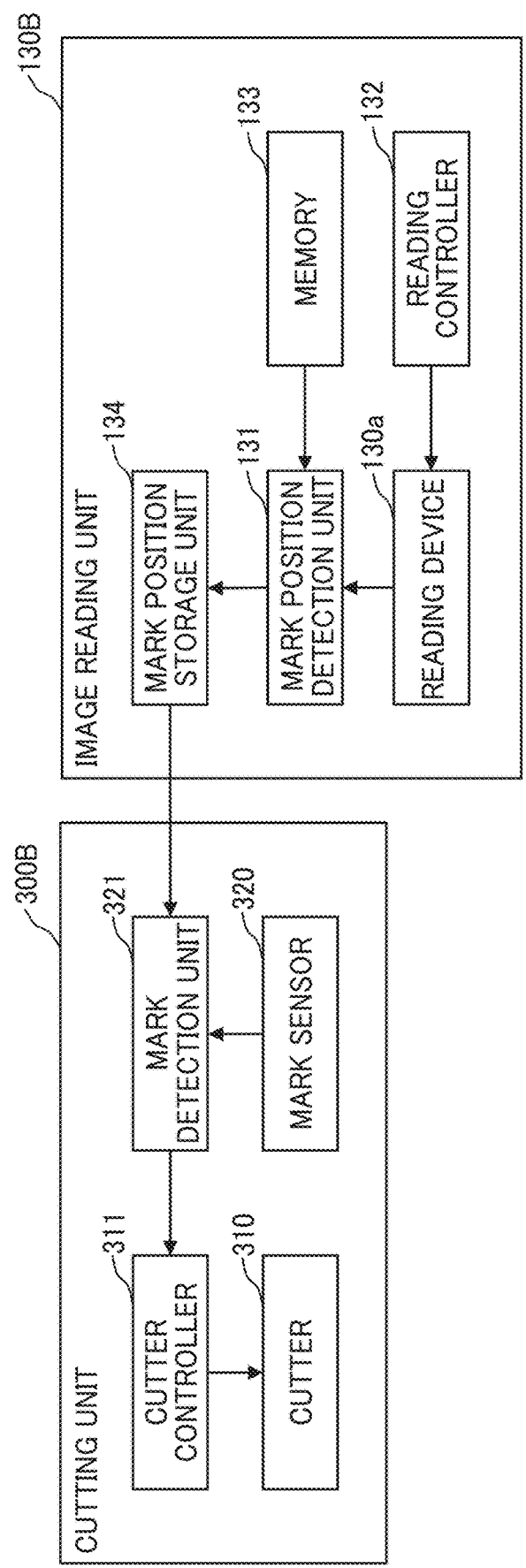
FIG. 9 is a block diagram illustrating functional configurations of an image reading unit and a cutting unit according to a second embodiment of the present disclosure.

FIG. 9 is a block diagram illustrating a functional example of the image reading unit 130B and the cutting unit 300B.

Figure 10:
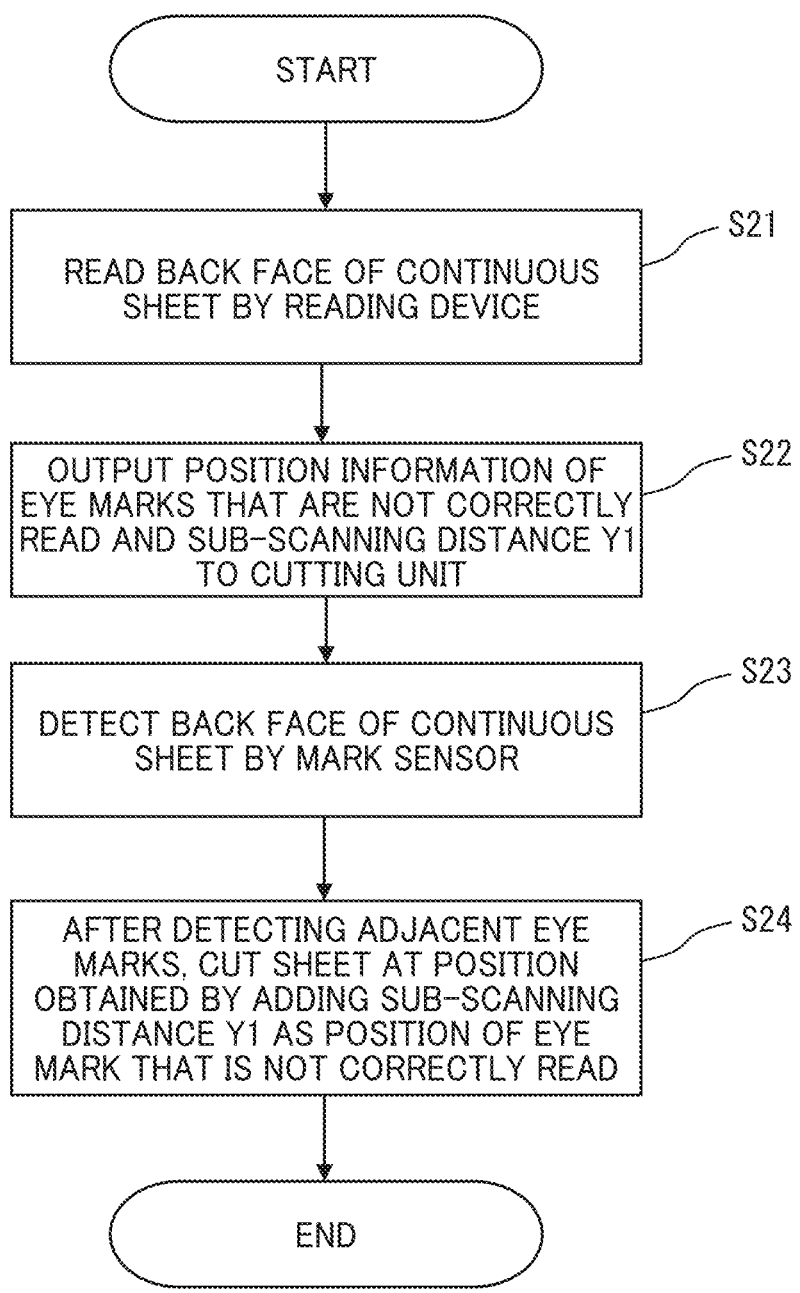
FIG. 10 is a flowchart of a process of estimating a mark position in the cutting unit.

FIG. 10 is a flowchart of a process of estimating the mark position in the cutting unit 300B.

In the continuous sheet 121 illustrated in FIG. 8, the eye mark m1b having a light color is formed among the plurality of eye marks m. FIG. 8 is a diagram in which the description of the present embodiment is added to the continuous sheet 121 illustrated in FIG. 4B.

The image reading unit 130B includes a reading device 130a, a mark position detection unit 131, a reading controller 132, a memory 133, and a mark position storage unit 134.

The reading controller 132 controls the reading device 130a. The reading controller 132 performs, for example, initial setting of the reading devices 130a and 130b, light amount and gain setting of illumination of the reading devices 130a and 130b, setting for adjustment operations such as shading and auto gain control, and execution of reading operations. The operations of the reading devices 130a and 130b (for example, reading start and reading end) are controlled so that the continuous sheet 121 is read when the continuous sheet 121 passes through the reading devices 130a and 130b.

The mark position storage unit 134 outputs the detection result of the mark position detection unit 131. For example, the mark position storage unit 134 receives a detection result related to the eye mark detected by the mark position detection unit 131, stores the detection result in a storage area, and notifies the cutting unit 300B of the detection result. The storage area is an area that can be referred to by the mark position storage unit 134, and is arranged in the image reading unit 130B or in a place other than the image reading unit 130B where the mark position storage unit 134 can be referred to. In addition, it is preferable that the storage area can be referred to from a unit or device other than the image reading unit 130 such as the cutting unit 300.

The cutting unit 300 includes a cutter 310, a cutter controller 311, mark sensors 320, and a mark detection unit 321.

The mark sensors 320 serve as a reference image sensing unit and detect eye marks m formed on a recording medium.

The cutter 310 and the cutter controller 311, as a processing device, process the recording medium at a predetermined position based on the detection result detected by the mark sensors 320.

The mark detection unit 321 corrects the detection result as a correction unit. The mark detection unit 321 detects the eye marks m based on, for example, the detection results of the mark sensors 320. The mark detection unit 321 holds a threshold value for detecting the eye mark m in advance.

Next, with reference to FIG. 10, an operation example is described in which a plurality of eye marks m of the continuous sheet 121 illustrated in FIG. 8 are detected, and an eye mark that cannot be normally read (in this example, an eye mark m1b) is corrected. Description of operations similar to those in FIG. 6 may be omitted as appropriate.

When the continuous sheet 121 illustrated in FIG. 8 passes through the reading device 130a, the reading device 130a reads the back surface 121c (eye marks m) of the continuous sheet 121 and generates read information (step S21).

The mark position detection unit 131 detects an eye mark that cannot be normally read from the read information read by the reading device 130a, acquires information (detection result) regarding the detected eye mark, and transmits the information to the mark position storage unit 134.

Specifically, for example, the mark position detection unit 131 detects a plurality of eye marks m from the read information, and acquires position information (position information of the eye mark m1b) that specifies which position of which label portion 121b corresponds to an eye mark m1b that cannot be normally read among the plurality of detected eye marks m. The mark position detection unit 131 also measures the sub-scanning distance Y1 between the right eye mark m2b corresponding to the eye mark m1b and the previous eye mark m2a by using the read information.

The mark position storage unit 134 stores, in the storage area, the position information of the eye mark m1b and the sub-scanning distance Y1 received from the mark position detection unit 131.

The mark position storage unit 134 outputs the position information of the eye mark m1b that cannot be normally read and the sub-scanning distance Y1 to the mark detection unit 321 of the cutting unit 300 (step S22). The mark position storage unit 134 also functions as an output unit.

Next, when the continuous sheet 121 passes through the mark sensor 320 of the cutting unit 300, the mark sensor 320 receives an electric signal corresponding to the brightness difference between the background color of the continuous sheet 121 and the eye mark m, and sends the electric signal to the mark detection unit 321.

When the received electric signal has a signal level lower than a threshold value (detection reference), the mark detection unit 321 determines that the eye mark m is present and detects the eye mark m (step S23).

Here, in the continuous sheet 121 of FIG. 8, the color of the eye mark m1b on the left side is light. Accordingly, the mark detection unit 321 cannot detect the eye mark m1b.

Therefore, the mark detection unit 321 detects an eye mark m1a adjacent to the eye mark m1b using the position information of the eye mark m1b and the sub-scanning distance Y1 received from the mark position storage unit 134, adds the sub-scanning distance Y1 to the position of the eye mark m1a to calculate the position where the eye mark m1b is present, and outputs the position information of each eye mark m including the eye mark m1b to the cutter controller 311. Here, the sub-scanning distance Y1 may be stored in advance in the memory 133 or may be obtained by measuring the distances Y1 between the eye marks m1a and m1b corresponding to the eye marks m2a and m2b, respectively, in the main scanning direction.

The cutter controller 311 controls the cutter 310 to cut the continuous sheet 121 into predetermined lengths based on the received position information of each of the eye marks m including the eye mark m1b (step S24).

According to the present embodiment, even when there is an eye mark m that cannot be normally read by the mark sensor 320 of the cutting unit 300, the mark detection unit 321 can calculate the position information of the eye mark m1b that cannot be normally read, using the information received from the mark position detection unit 131, to specify the position of the eye mark m1b and cut the continuous sheet 121.

Note that the present embodiment is not limited to a configuration in which the position information of the eye mark m1b that cannot be normally read and the sub-scanning distance Y1 are output from the mark position storage unit 134 of the image reading unit 130 to the mark detection unit 321 of the cutting unit 300. For example, the mark detection unit 321 of the cutting unit 300 may acquire (read) information from the mark position storage unit 134 of the image reading unit 130. In addition, the mark position storage unit 134 may transmit the detection result regarding the eye mark to the cutting unit 300 at a predetermined timing. The predetermined timing may be notified from a controller or a cutting unit in the apparatus.

Although FIG. 8 illustrates a case where the color of the eye mark m1b is light, the present processing can be used in a case where bright dust is attached to the eye mark m (stain W2 in FIG. 4C).

Figure 11:
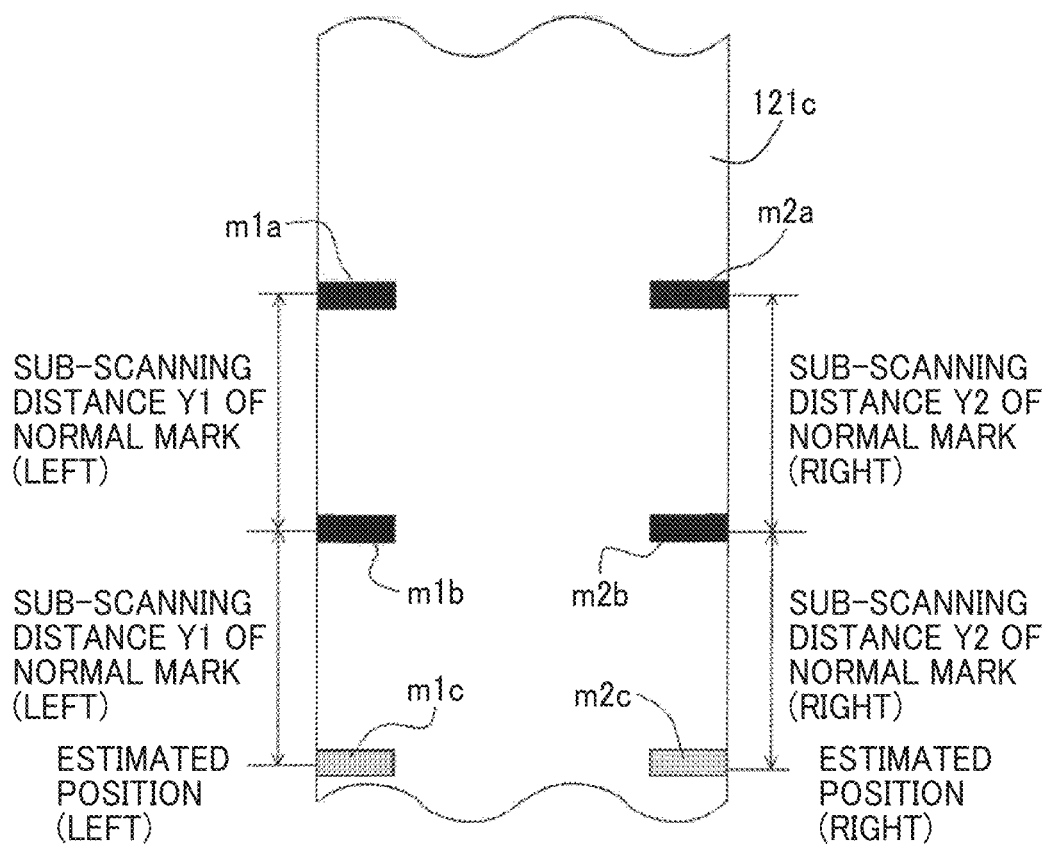
FIG. 11 is a diagram illustrating a case where two eye marks in a width direction of a continuous sheet are both light in color.
Figure 12:
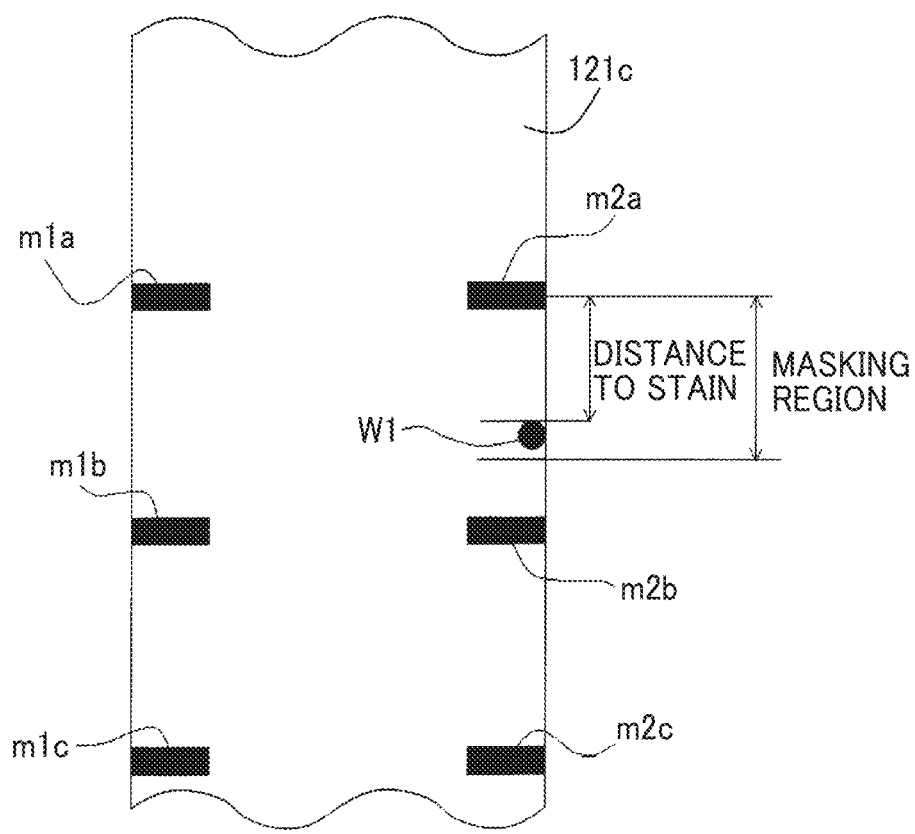
FIG. 12 is a diagram illustrating an example of a continuous sheet having a stain in the vicinity of an eye mark.

Next, with reference to FIGS. 11 and 12, a description is given of an operation example in a case where the position of an eye mark that cannot be normally read is different from that in FIG. 8.

FIG. 11 illustrates a case where two eye marks in the main scanning direction (direction intersecting the conveyance direction of the continuous sheet 121) are both light in color.

In this case, based on the result read by the reading device 130a, the mark position detection unit 131 stores the sub-scanning distance Y1 between the eye marks m1a and m1b and the sub-scanning distance Y2 between the eye marks m2a and m2b in the mark position storage unit 134.

The mark position storage unit 134 outputs information on the positions of the eye marks m1c and m2c that cannot be normally read and the sub-scanning distances Y1 and Y2 to the mark detection unit 321 of the cutting unit 300.

The mark detection unit 321 calculates that the eye mark m1c is located at a position at the sub-scanning distance Y1 from the eye mark m1b and the eye mark m2c is located at a position at the sub-scanning distance Y2 from the eye mark m2b, and outputs the calculated positions to the cutter controller 311. The cutter controller 311 controls the cutter 310 to cut the continuous sheet 121 into predetermined lengths based on the received positions of the eye marks m1c and m2c.

In this manner, even when the two eye marks m in the main scanning direction cannot be normally read by the mark sensor 320 of the cutting unit 300, the continuous sheet 121 can be cut according to the above-described estimation of the position.

FIG. 12 illustrates an example of the continuous sheet 121 in which there is a stain such as toner falling near the eye mark.

As described with reference to FIG. 5A, when the stain W1 has the same black color as the eye mark, the output of the read value of the reading device 130a is a read value at a level lower than the threshold value. Accordingly, when the mark position detection unit 131 only determines whether the level is lower than the threshold value, the mark position detection unit 131 detects the stain W1 as the eye mark m.

Therefore, in a case where the output of the read value of the reading device 130a is at a position different from the interval between normal eye marks in the sub-scanning direction, it is preferable to perform mask processing so that the stain W1 is not detected as an eye mark when the cutting unit 300 detects the eye mark m.

For example, based on the read information read by the reading device 130a and the interval in the sub-scanning direction stored in the memory 133, the mark position detection unit 131 stores, in the mark position storage unit 134, information on the presence of a stain W1 indicating that the stain W1 is not a normal eye mark and information on the distance from the eye mark m2a to the stain W1.

Next, the mark position storage unit 134 outputs information on the presence of the stain W1 and the distance from the eye mark m2a to the stain W1 to the mark detection unit 321 of the cutting unit 300.

The mark detection unit 321 sets a mask range based on the received information so as not to detect the stain W1. In this manner, the mark detection unit 321 does not detect an eye mark m even if the mark sensor 320 detects a stain W1 in the mask range.

Therefore, the mark detection unit 321 outputs to the cutter controller 311 that the eye mark m2b is the cutting position next to the eye mark m2a. Based on the received positions of the eye marks m2a and m2b, the cutter controller 311 controls the cutter 310 so as to cut the continuous sheet 121 into predetermined lengths.

The mark detection unit 321 performs correction to exclude the detection result determined not to be an eye mark from the detection results detected by the mark sensors 320.

The correction allows cutting of the continuous sheet 121 at an appropriate position without detecting the stain W1 as an eye mark.

Third Embodiment

A third embodiment is described with reference to FIGS. 13 and 14.

In the present embodiment, an example is described in which a cutting unit 300B changes the detection criterion for a mark sensor 320 to detect an eye mark, and corrects the detection result of the eye mark. The third embodiment is described using the image reading unit 130B and the cutting unit 300B of the second embodiment. The configuration of an image forming system 100 according to the third embodiment is the same as that of the first embodiment.

Figure 13:
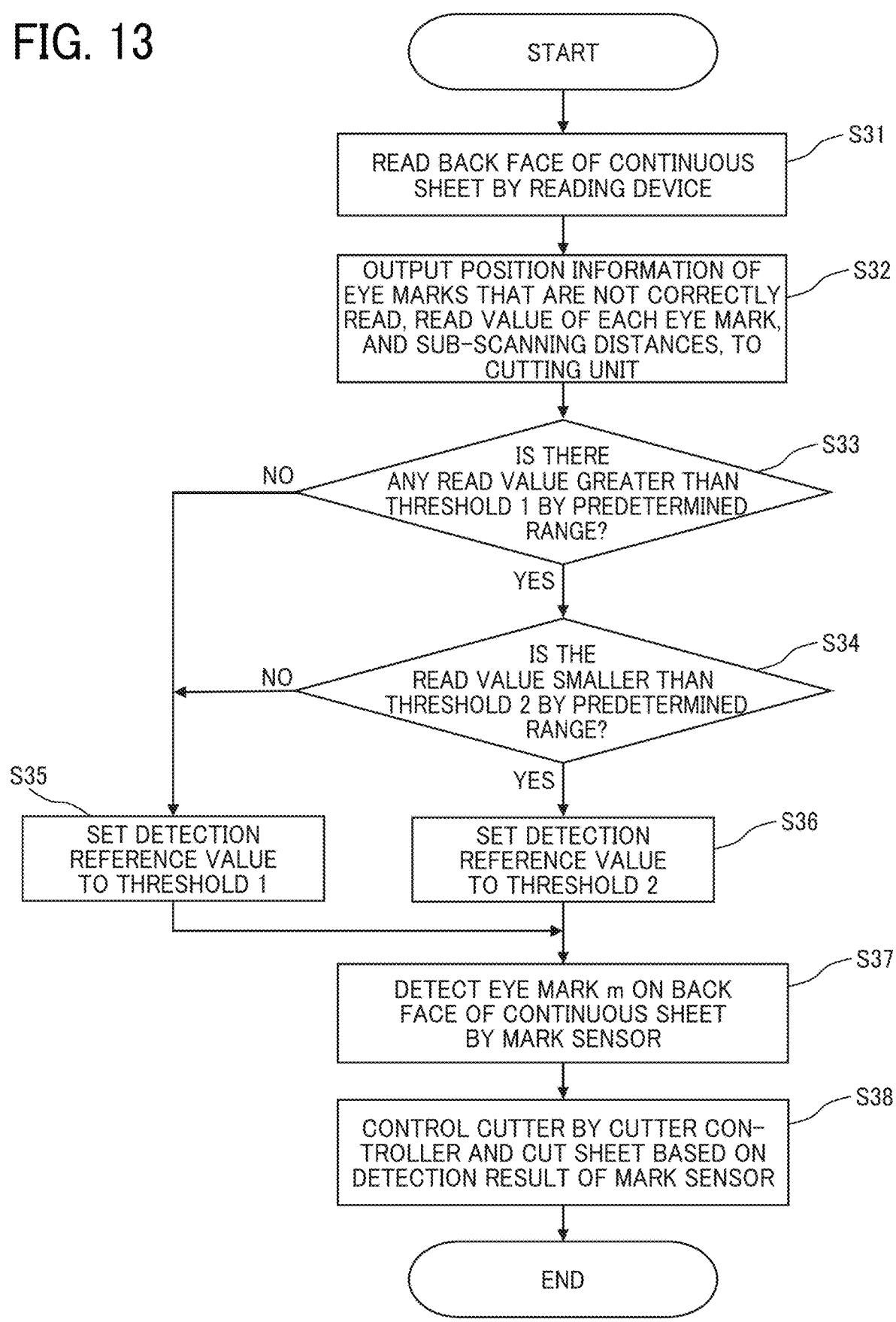
FIG. 13 is a flowchart illustrating an operation example according to a third embodiment of the present disclosure.

FIG. 13 is a flowchart illustrating an operation example in which a mark detection unit 321 of the cutting unit 300B changes a threshold value for eye mark detection and the mark sensor 320 detects an eye mark. The operation example of FIG. 13 uses the continuous sheet 121 illustrated in FIG. 4B.

Figure 14:
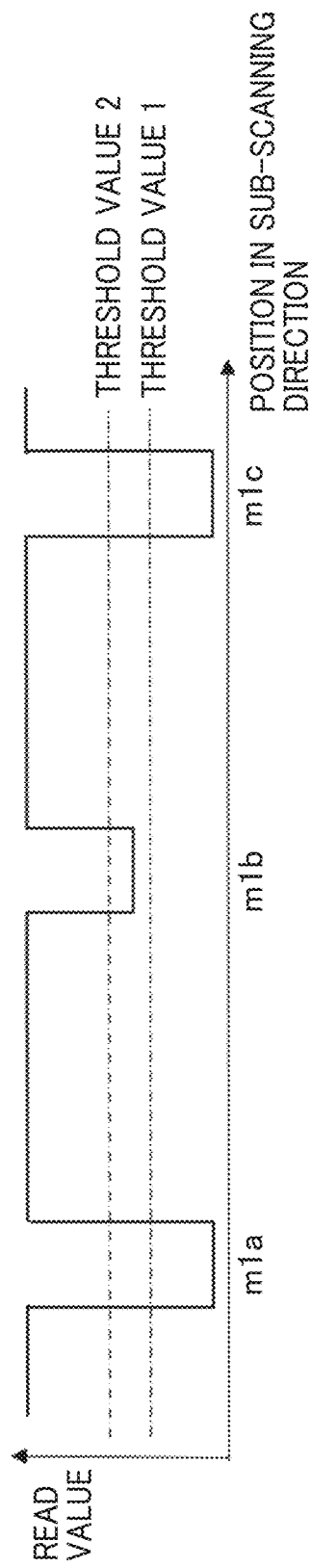
FIG. 14 is a diagram illustrating a relation between a read value of a reading device and threshold values on the line A-B of the continuous sheet illustrated in FIG. 4B.

FIG. 14 is a diagram illustrating a relation between a read value of a reading device 130a and threshold values on the line A-B of the continuous sheet 121 illustrated in FIG. 4B.

In this example, when the position of the mark sensor 320 in the main scanning direction is arranged on the line A-B in FIG. 4B, an output value similar to the read value in FIG. 14 is obtained.

An operation example of the present embodiment is described with reference to FIG. 13. In FIG. 13, an eye mark that cannot be normally read is referred to as an eye mark m1b.

The mark detection unit 321 holds a plurality of threshold values (threshold value 1 and threshold value 2) in advance. Alternatively, the mark position storage unit 134 (or the memory 133) in the image reading unit 130B may hold a plurality of threshold values in advance, and the mark detection unit 321 may receive the plurality of threshold values from the mark position storage unit 134.

Description of operations similar to those in FIGS. 6 and 10 may be omitted as appropriate.

When the continuous sheet 121 passes through the reading device 130a, the reading device 130a reads the back surface 121c (eye mark m) of the continuous sheet 121 and generates read information (step S31).

The mark position detection unit 131 detects an eye mark that cannot be normally read from the read information read by the reading device 130a, acquires information regarding the detected eye mark, and transmits the information to the mark position storage unit 134.

Specifically, for example, the mark position detection unit 131 detects a plurality of eye marks m from the read information, and acquires position information (position information of the eye mark m1b) and a read value of each eye mark m. The position information specifies which position of which label portion 121b corresponds to an eye mark m1b that cannot be normally read among the plurality of detected eye marks m. The mark position detection unit 131 measures, using the read information, a sub-scanning distance Y between the eye marks m in the sub-scanning direction.

The mark position storage unit 134 stores, in the storage area, the position information of the eye mark m1b, the read value of each eye mark m, and the sub-scanning distance Y received from the mark position detection unit 131.

The mark position storage unit 134 outputs the position information of the eye mark m1b, the read value of each eye mark, and the sub-scanning distance Y to the mark detection unit 321 of the cutting unit 300 (step S32).

When the read value of each eye mark does not exceed the threshold value 1 by a predetermined range (NO in S33), the mark detection unit 321 sets the detection reference of the read value of the mark sensor 320 to the threshold value 1 (step S35).

When the read value of each eye mark exceeds the threshold value 1 and the threshold value 2 by a predetermined range (YES in S33 and NO in S34), the mark detection unit 321 sets the detection reference of the read value of the mark sensor 320 to the threshold value 1 (step S35).

When the read value of each eye mark exceeds the threshold value 1 by a predetermined range and falls below the threshold value 2 by a predetermined range (YES in S33 and YES in S34), the mark detection unit 321 sets the detection reference of the read value of the mark sensor 320 to the threshold value 2 (step S36).

Next, when the continuous sheet 121 passes through the mark sensor 320 of the cutting unit 300, the mark sensor 320 receives an electric signal corresponding to the brightness difference between the background color of the continuous sheet 121 and the eye mark m (step S37). When the received electric signal has a signal level lower than a threshold value (threshold value 1 set in S35 or threshold value 2 set in S36), the mark detection unit 321 determines that the eye mark m is present. In FIG. 4B, the color of the eye mark m1b on the left side is light. However, since the threshold value of the read value is set to the threshold value 2, the mark detection unit 321 can detect that there is an eye mark at the position of the eye mark m1b.

The mark detection unit 321 outputs position information of each eye mark m including the eye mark m1b to the cutter controller 311.

The cutter controller 311 controls the cutter 310 to cut the continuous sheet 121 into predetermined lengths based on the received position information of each eye mark m (step S38).

In this manner, even when the color of the eye mark m of the continuous sheet 121 is light, changing the threshold value of the read value of the mark sensor 320 allows cutting to be performed based on the eye mark of the light color.

In the present embodiment, an operation example in which the mark detection unit 321 switches the detection reference using a plurality of threshold values has been described. However, in some embodiments, the mark position detection unit 131 of the image reading unit 130 may select a threshold value serving as the detection reference from a plurality of threshold values.

At this time, it is assumed that the memory 133 of the image reading unit 130B holds in advance a plurality of threshold values (threshold value 1, threshold value 2, and the like) as detection criteria of the mark sensor 320.

The mark position detection unit 131 detects a plurality of eye marks m from the read information obtained by reading of the reading device 130a and acquires position information (position information of the eye mark m1b) and a read value of each eye mark m. The position information specifies which position of which label portion 121b corresponds to an eye mark m1b that cannot be normally read among the plurality of detected eye marks m. The mark position detection unit 131 measures, using the read information, a sub-scanning distance Y between the eye marks m in the sub-scanning direction.

For example, the mark position detection unit 131 may perform the determinations of step S33 and step S34 in FIG. 13, select the threshold value 1 or the threshold value 2 as the detection reference of the mark sensor 320, and send the selected threshold value to the mark position storage unit 134. The mark position storage unit 134 may notify the mark detection unit 321 of the threshold value.

In addition to the above-described processing, the mark position detection unit 131 may detect whether there is an eye mark that cannot be normally read even when the threshold value selected as the detection reference is used, and output the threshold value selected as the detection reference of the mark sensor 320, the position information of the eye mark that cannot be normally read, the read value of each eye mark, and the sub-scanning distance Y to the mark detection unit 321 when there is an eye mark that cannot be normally read (for example, presence of stain).

Fourth Embodiment

A fourth embodiment is described with reference to FIG. 15. The fourth embodiment is described using the image reading unit 130B and the cutting unit 300B of the second embodiment. The configuration of an image forming system 100 according to the third embodiment is the same as that of the first embodiment.

Figure 15:
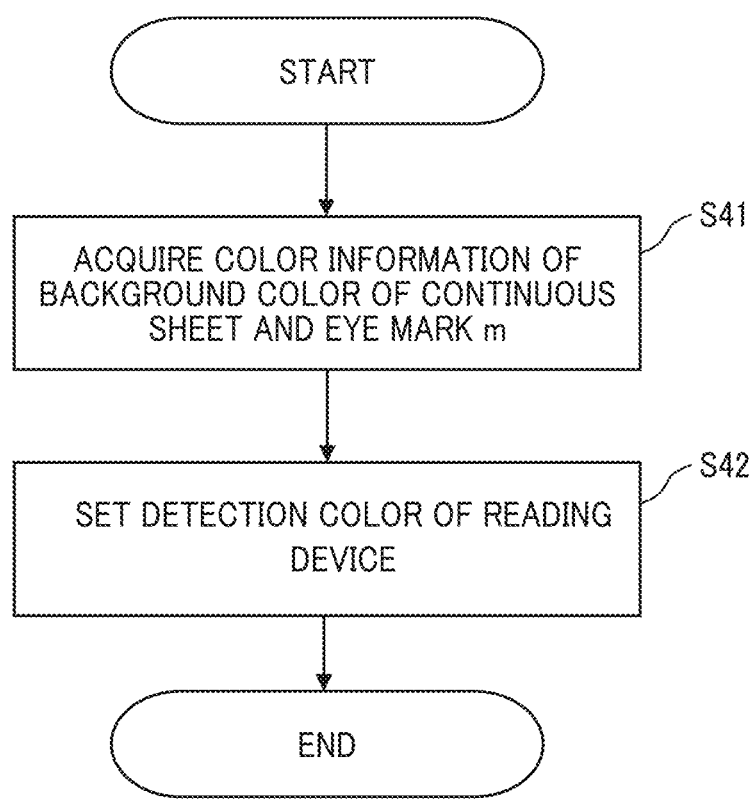
FIG. 15 is a flowchart illustrating an operation example of an image reading unit according to a fourth embodiment of the present disclosure.

FIG. 15 is a flowchart illustrating an operation example of an image reading unit according to the fourth embodiment.

A line image sensor in a reading device 130a can obtain read images of three colors of red, green, and blue (RGB).

Here, depending on the combination of the color of the background and the color of an eye mark m, the contrast may not be obtained and the eye mark may not be detected.

Therefore, as illustrated in FIG. 15, a reading controller 132 of the image reading unit 130B may set the detection color of the reading device 130a by a combination of the color of the background and the color of the eye mark.

The reading controller 132 acquires color information of the background color of the continuous sheet 121 read by the image reading unit 130B and the color of the eye mark m (step S41). The color information may be acquired, for example, by the user's input of information or by reading of information (for example, a two-dimensional code) printed on the continuous sheet 121.

Next, the reading controller 132 sets the detection color of the reading device 130a from the color information (step S42).

TABLE 2

| Detection Color | Background | Eye Mark |
| --- | --- | --- |
| RGB | White | Black |
| R | Blue | White |

Table 2 illustrates an example of the color of the line image sensor in the reading device 130a for detecting an abnormality.

In the case of a combination that can obtain a read value regardless of color, such as a combination in which the background (the surface of the continuous sheet 121) is white and the eye mark is black, the detection color of the line image sensor may be any color of RGB.

On the other hand, in a case where the eye mark is white on a bluish background, it is difficult to obtain contrast when the detection color of the line image sensor is detected as blue, and thus detection is performed using a complementary color R (red).

In this manner, the detection color of the line image sensor in the reading device 130a is switched based on the background color and the color of the eye mark, thus allowing the reading device 130a to appropriately detect the eye mark.

The above-described example is merely one example, and the detection may be performed using a read value of an image color in which the contrast between the color of the background and the color of the eye mark is the highest.

Fifth Embodiment

A fifth embodiment is described with reference to FIGS. 16 to 18.

Figure 16:
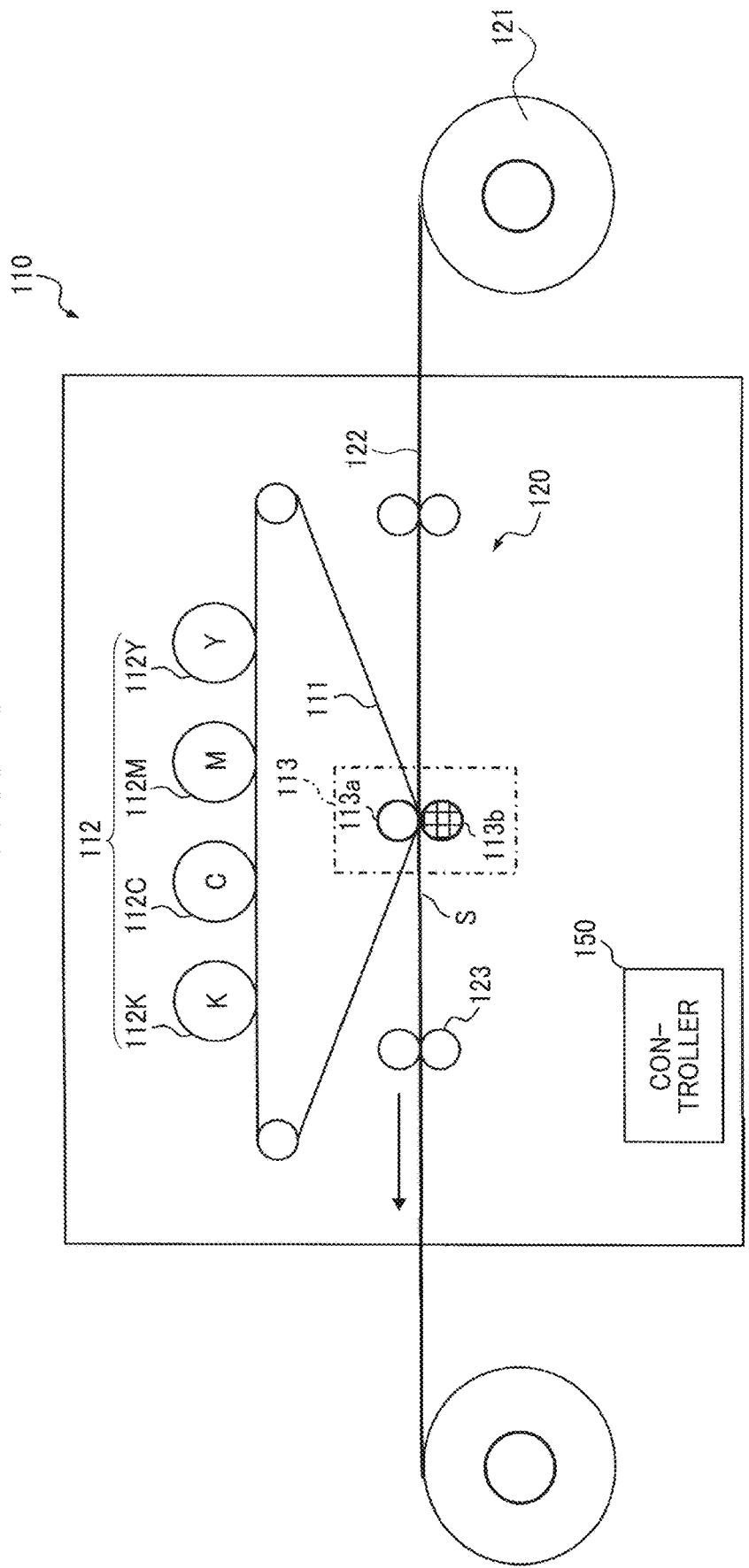
FIG. 16 is a diagram illustrating a schematic configuration of an image forming apparatus according to a fifth embodiment of the present disclosure.

FIG. 16 is a diagram illustrating a schematic configuration of an image forming apparatus according to the fifth embodiment.

Figure 17:
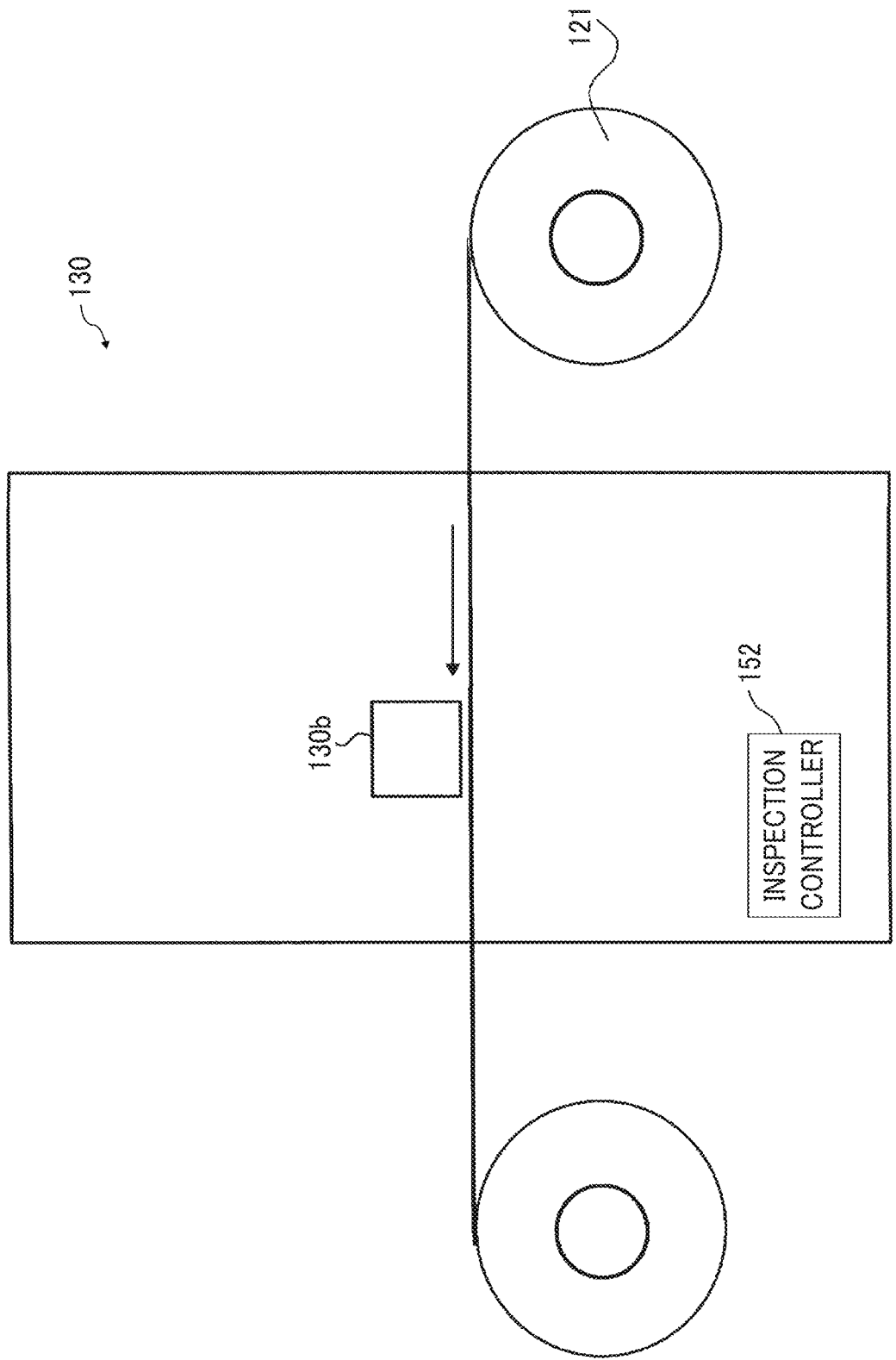
FIG. 17 is a diagram illustrating a schematic configuration of an inspection apparatus according to the fifth embodiment of the present disclosure.

FIG. 17 is a diagram illustrating a schematic configuration of an inspection apparatus according to the fifth embodiment.

Figure 18:
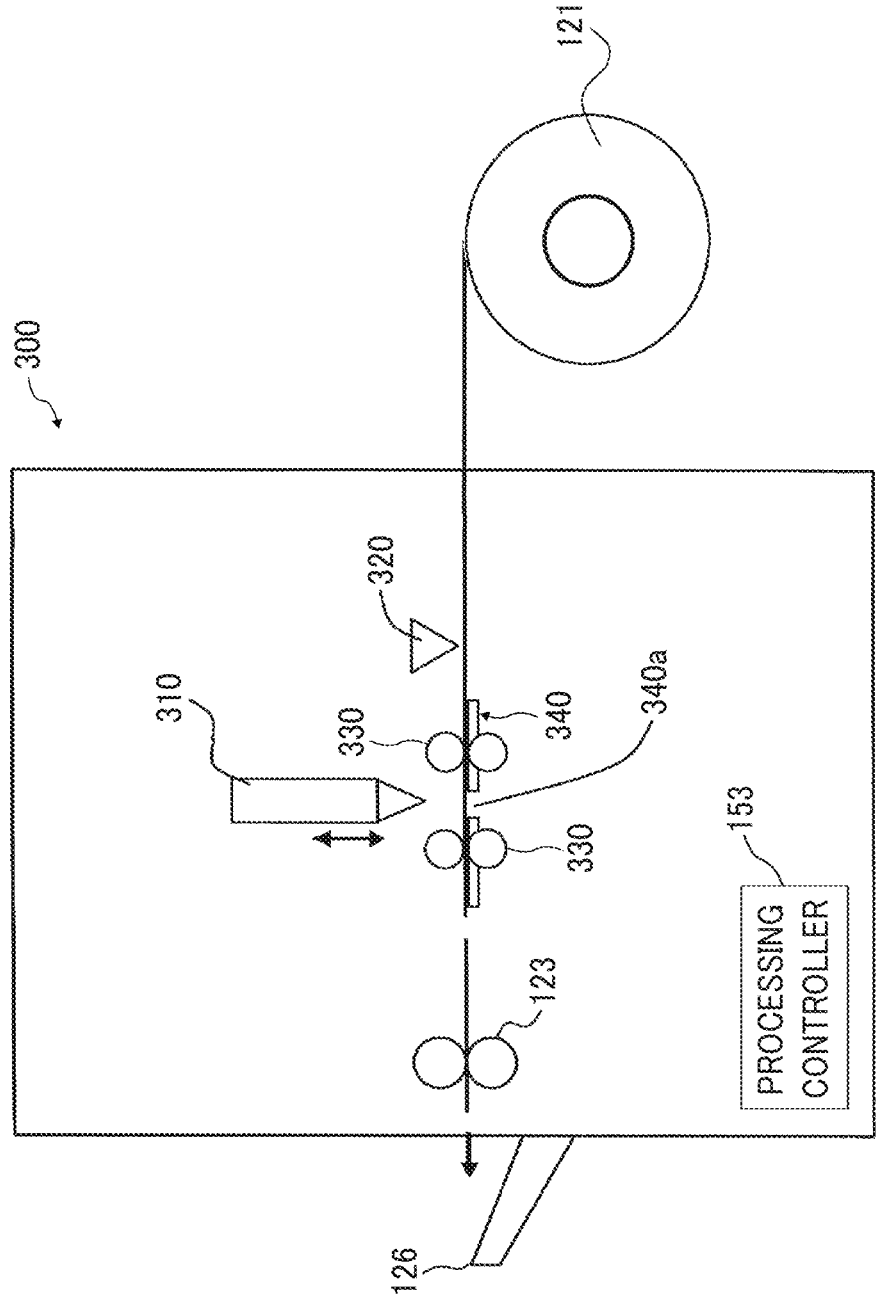
FIG. 18 is a diagram illustrating a schematic configuration of a processing apparatus according to the fifth embodiment of the present disclosure.

FIG. 18 is a diagram illustrating a schematic configuration of a processing apparatus according to the fifth embodiment.

The present embodiment is different from the above-described embodiments in that an image forming unit 110 serving as an image forming apparatus, an image reading unit 130 serving as an inspection apparatus (reading apparatus), and a cutting unit 300 serving as a processing apparatus (post-processing machine) have different configurations.

As illustrated in FIGS. 17 and 18, the image reading unit 130 includes an inspection controller 152 that controls the entire inspection apparatus, and the cutting unit 300 includes a processing controller 153 that controls the entire processing apparatus. The inspection controller 152 and the processing controller 153 execute basic processing of each unit (apparatus) in the same manner as the controller 150 described above.

The image reading unit 130 may use, for example, a function example of any one of the image reading unit 130A and the image reading unit 130B of the above-described embodiments. The cutting unit 300 may use, for example, a function example of the cutting unit 300B.

The image forming apparatus illustrated in FIG. 16 feeds a continuous sheet 121 on which eye marks m are formed, forms an image on a label portion 121b, and then ejects and winds up the sheet. Unlike the above-described embodiments, the eye mark m is formed on the same surface as the label portion 121b.

Next, the continuous sheet 121 on which the image has been formed in FIG. 16 is set in the inspection apparatus illustrated in FIG. 17. The continuous sheet 121 is fed out, the eye mark is detected by a reading device 130b having a line image sensor similar to that of the above-described embodiments, and the presence or absence of abnormality of the eye mark is detected. The continuous sheet 121 that has passed through the reading device 130b is inspected, ejected, and wound up.

The continuous sheet 121 inspected in FIG. 17 is set in the processing apparatus illustrated in FIG. 18. The continuous sheet 121 is fed out, and after an eye mark is detected by a mark sensor 320 (a point-type reflection sensor or a transmission-type sensor), the continuous sheet is cut at predetermined lengths by the cutting unit 300 and ejected to an ejection tray 126.

Also in this embodiment, the eye mark detection and cutting control of the above-described embodiments can be applied.

Note that the image forming unit 110 of FIG. 16 is not limited to a configuration in which the continuous sheet 121 having eye marks m and label portions 121b formed on the same surface is used and images are formed on the label portions 121b. For example, the transfer device 113 may transfer the eye marks m and the images on the label portions 121b to the same surface of the continuous sheet 121. Alternatively, images of eye marks may be formed on the back surface 121c of the continuous sheet 121, and the continuous sheet may be wound. After the continuous sheet 121 is reset, the continuous sheet may be fed so that the base material 121a faces upward, images may be formed on the label portions 121b, and the continuous sheet may be wound.

Sixth Embodiment

A sixth embodiment is described with reference to FIGS. 19 and 20.

Figure 19:
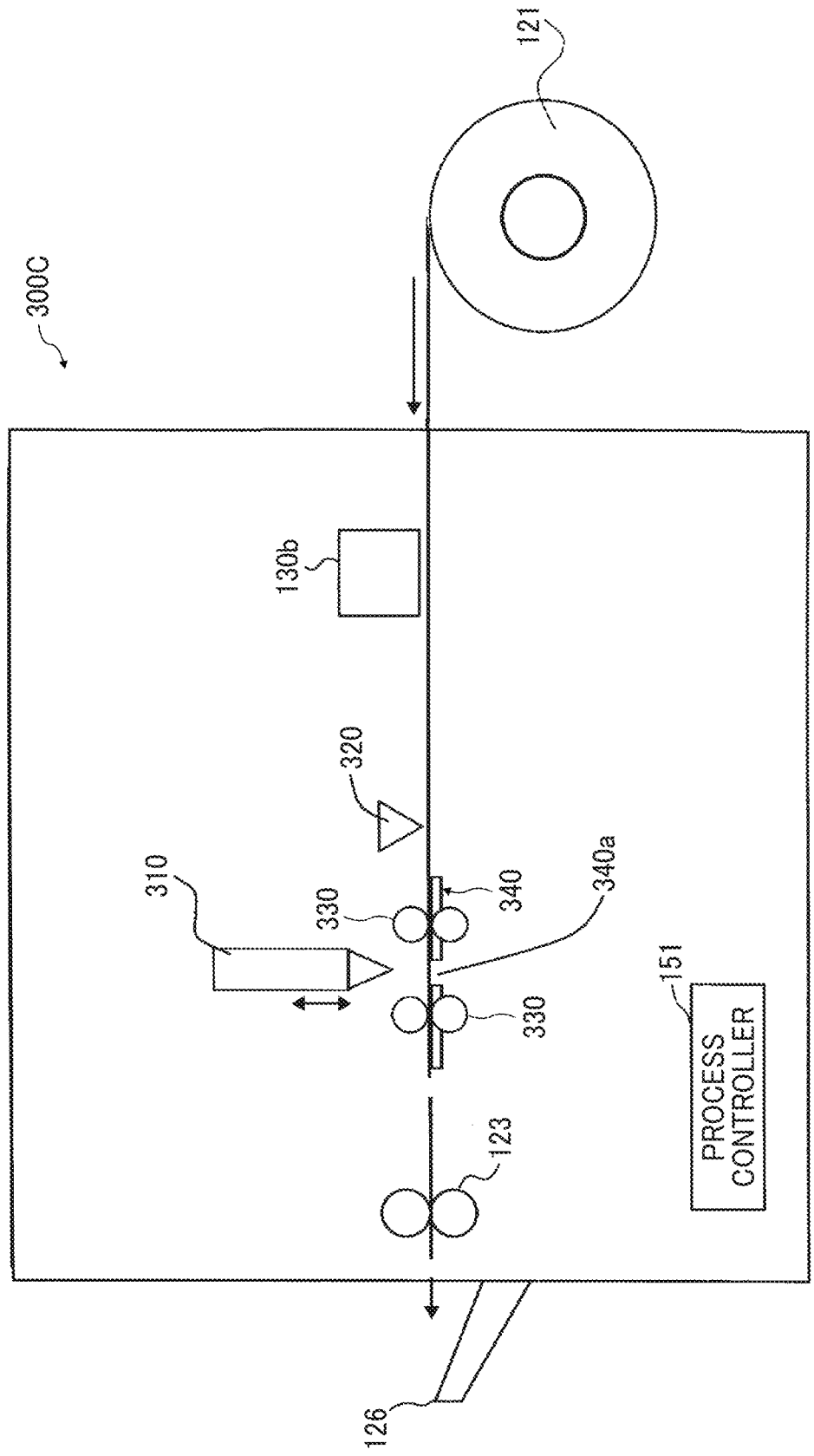
FIG. 19 is a diagram illustrating a schematic configuration of a processing apparatus according to a sixth embodiment of the present disclosure.

FIG. 19 is a diagram illustrating a schematic configuration of a processing apparatus according to the sixth embodiment.

Figure 20:
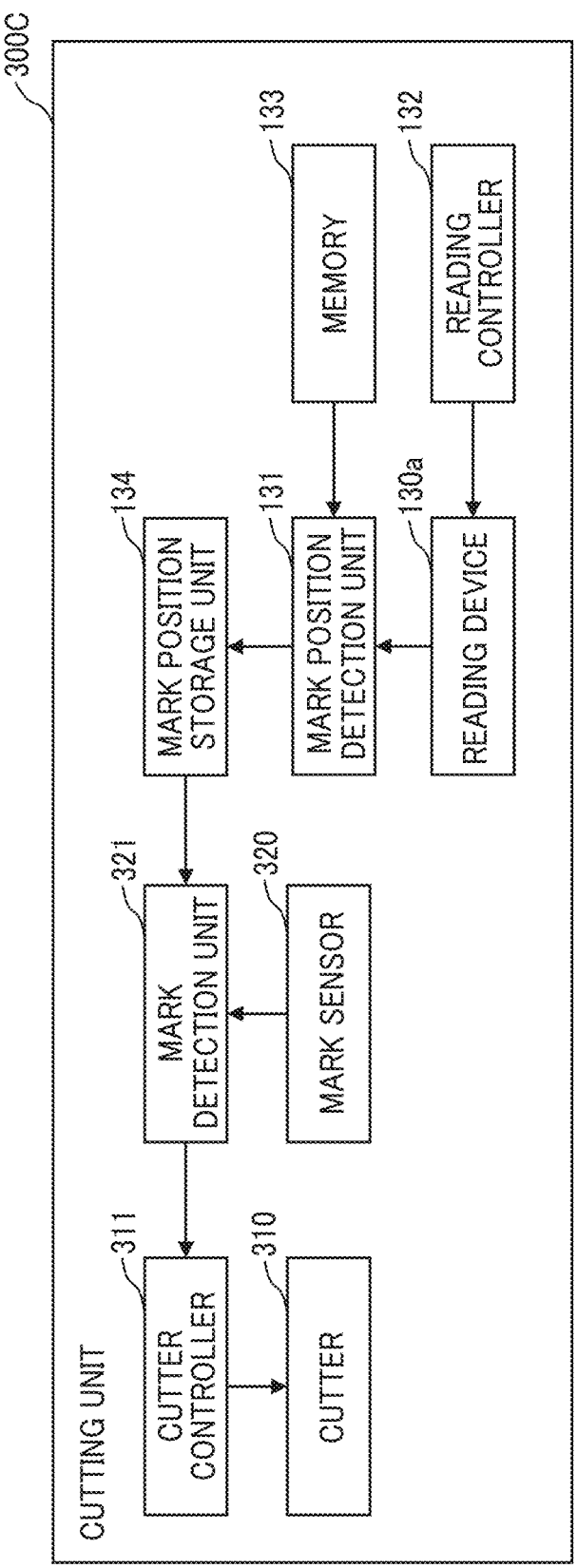
FIG. 20 is a block diagram illustrating a functional configuration of the processing apparatus according to the sixth embodiment of the present disclosure.

FIG. 20 is a block diagram illustrating a functional example of the processing apparatus according to the sixth embodiment.

The function of the inspection apparatus described in the fifth embodiment is integrated in the processing apparatus according to the sixth embodiment.

A cutting unit 300C serving as the processing apparatus is a configuration example in which a reading device 130b that reads a base material 121a of a continuous sheet 121 and a processing controller 151 that controls the entire cutting unit 300C are added to the cutting unit 300 of FIG. 18.

The sixth embodiment can be configured as illustrated in the block diagram of FIG. 20. The cutting unit 300C has a combination of the functions of the image reading unit 130B and the cutting unit 300B illustrated in FIG. 9. Note that a mark position storage unit 134 may be omitted and a mark position detection unit 131 may be connected to a mark detection unit 321 (serving as a correction unit).

Also in this embodiment, the eye mark detection and cutting control of the above-described embodiments can be applied.

Seventh Embodiment

A seventh embodiment is described with reference to FIGS. 21 and 22.

Figure 21:
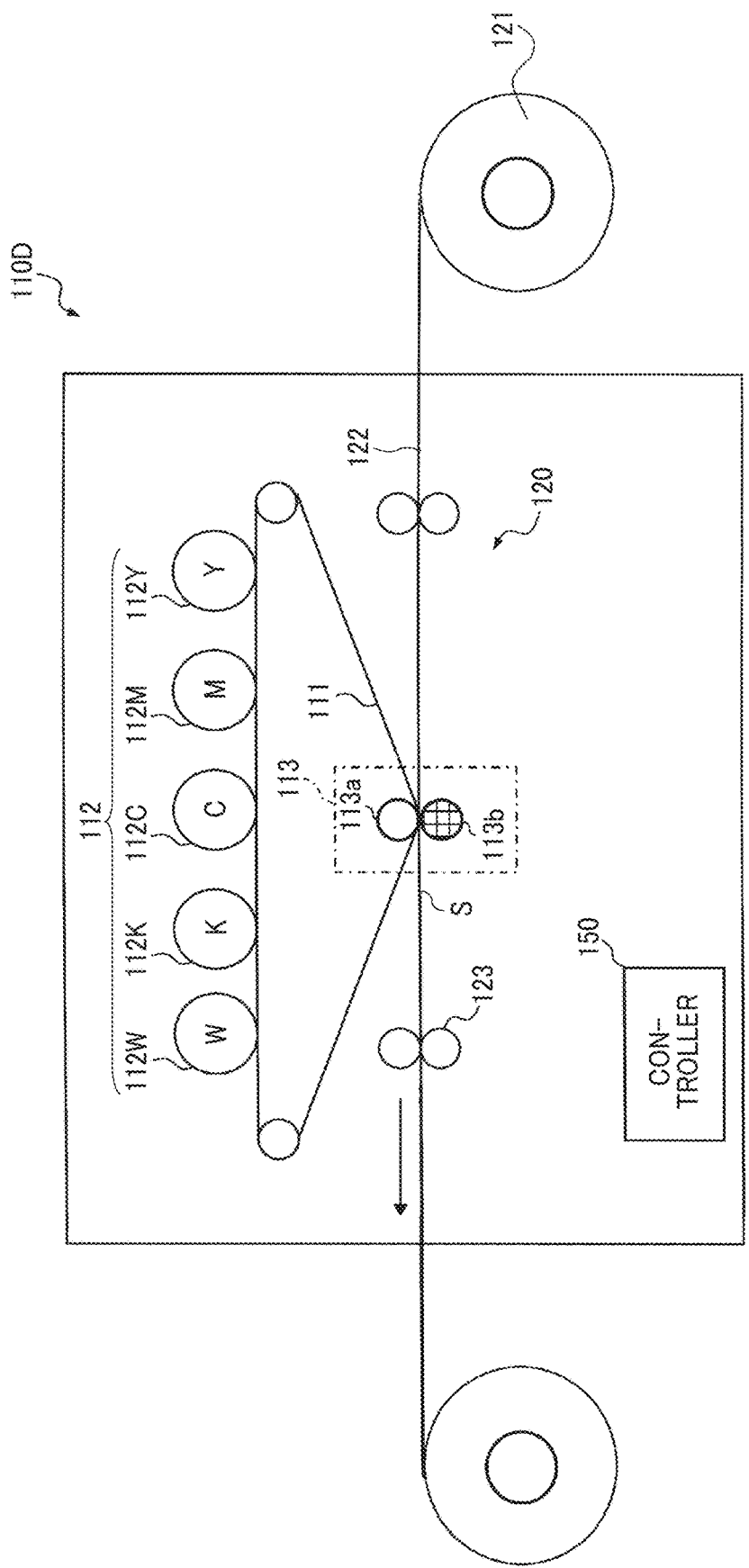
FIG. 21 is a diagram illustrating a schematic configuration of an image forming apparatus according to a seventh embodiment of the present disclosure.

FIG. 21 is a diagram illustrating a schematic configuration of an image forming apparatus according to the seventh embodiment.

Figure 22:
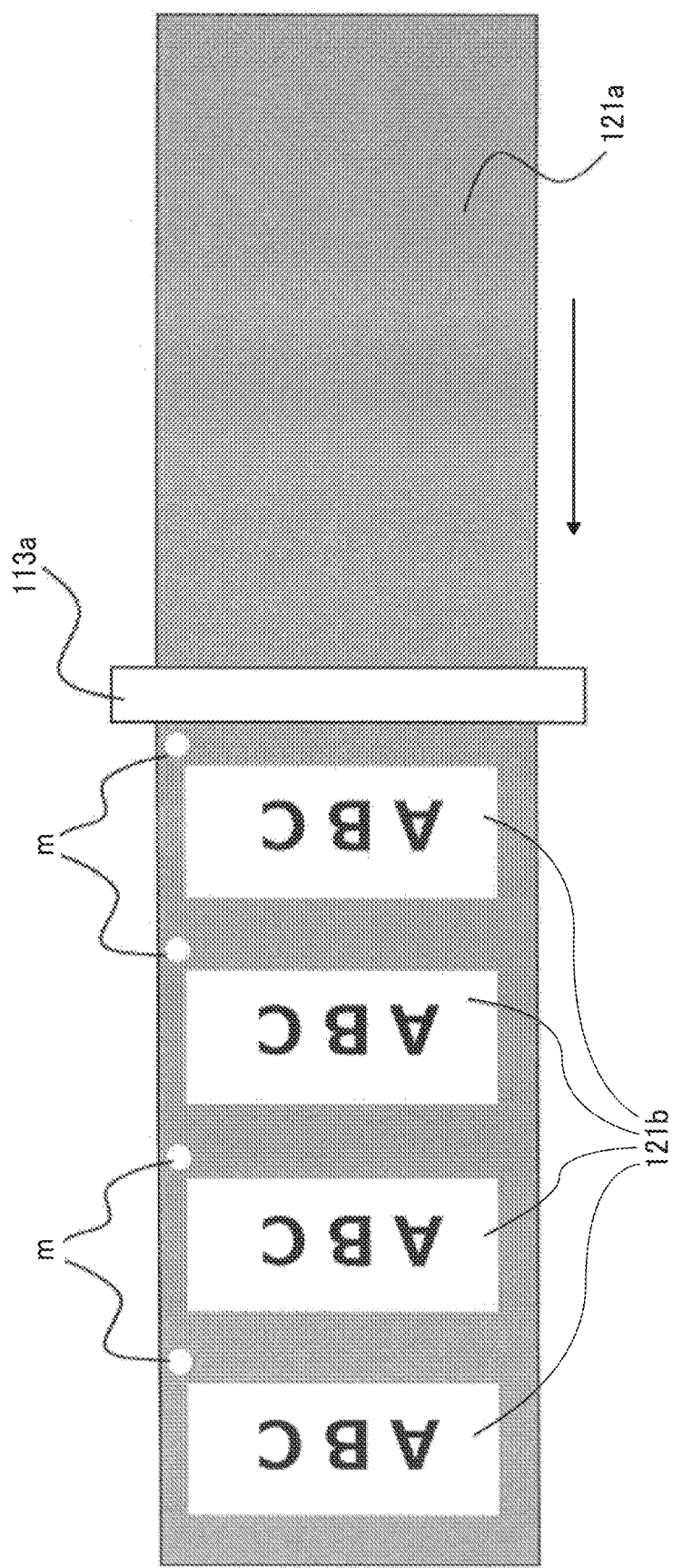
FIG. 22 is a diagram illustrating a state of a continuous sheet on which images are formed by a transfer device, according to the seventh embodiment of the present disclosure.

FIG. 22 is a diagram illustrating an example of a state of a continuous sheet on which an image is formed by a transfer device, according to the seventh embodiment.

In the above-described embodiments, the image forming unit 110 forms an image using yellow (Y), magenta (M), cyan (C), and black (K) toners. An image forming unit 110D serving as the image forming apparatus according to the present embodiment forms an image in five colors including white (W).

Further, in this embodiment, eye marks m and label portions 121b are formed on the same surface of the continuous sheet 121. Therefore, the inspection apparatus and the processing apparatus according to the present embodiment may be, for example, the inspection device of FIG. 17 and the processing apparatus of FIG. 18, or the processing apparatus of FIG. 19.

Figure 24:
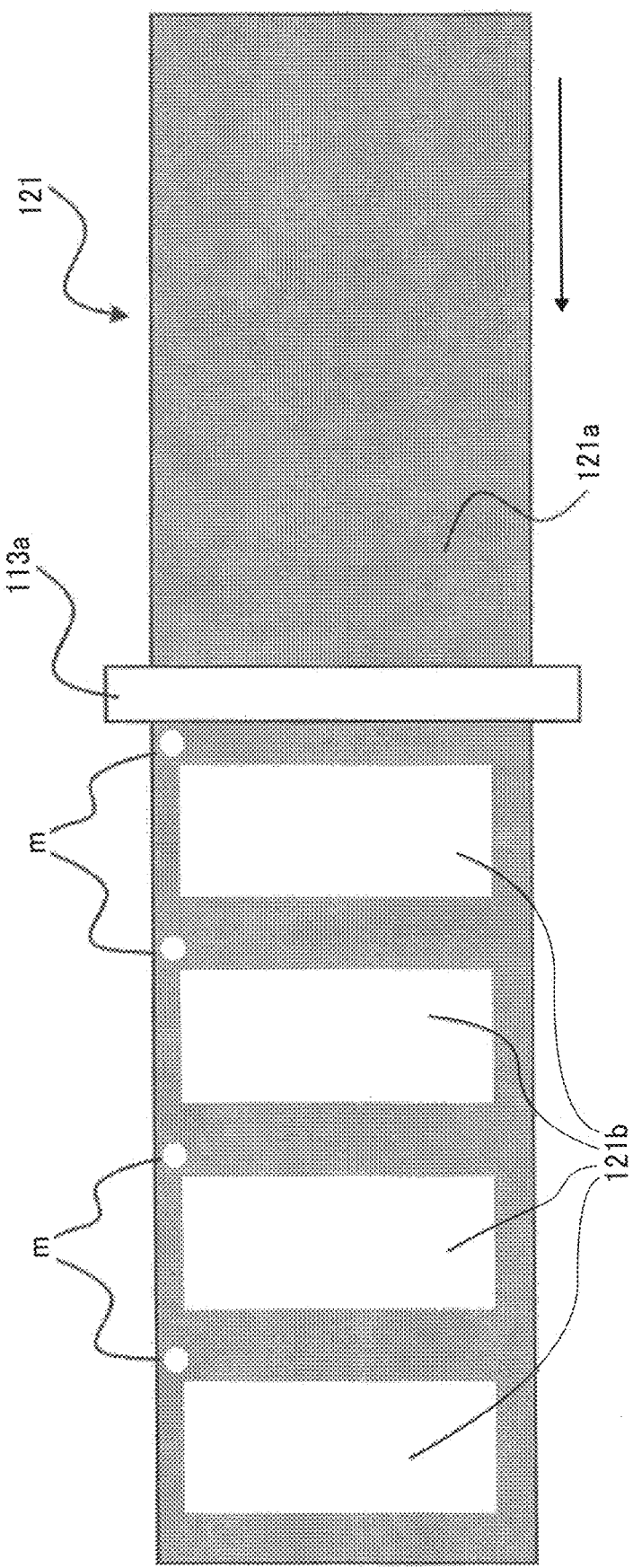
FIG. 24 is a diagram illustrating a state of a continuous sheet on which images are formed by the transfer device, according to the eighth embodiment of the present disclosure.
Figure 25:
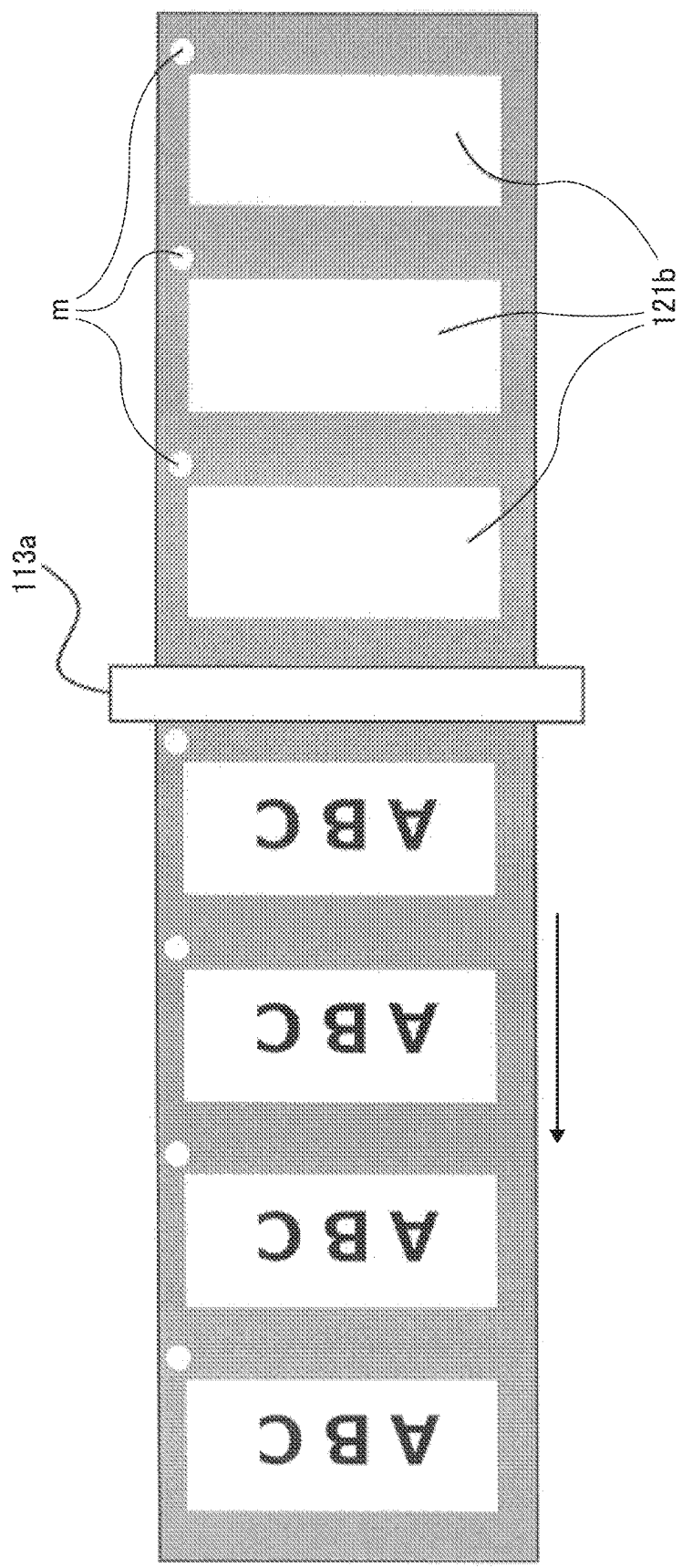
FIG. 25 is a diagram illustrating a state of the continuous sheet on which images are further formed on the continuous sheet of FIG. 24.

The image forming unit 110D serving as the image forming apparatus illustrated in FIG. 21 can form an image on the continuous sheet 121 as illustrated in FIG. 22 or FIGS. 24 and 25 described below. The base material 121a (front surface) of the continuous sheet 121 has a color different from the color of the label portion 121b and the eye mark m. The continuous sheet 121 may have an adhesive surface on a back surface of the base material 121a and be bonded to the back surface 121c of the continuous sheet 121, or may not have an adhesive surface on the back surface of the base material 121a.

In FIG. 22, the continuous sheet 121 is fed out, and the transfer device 113 forms the background region of the label portions 121b and the eye mark m in white and forms an image in the background region of the label portion 121b. The eye mark m is not a rectangular shape (as in the above-described embodiments) but a circular shape. In FIG. 22, the eye marks m are disposed only on one side of the continuous sheet in the main scanning direction. However, in some embodiments, the eye marks m may be disposed on both sides of the continuous sheet in the main scanning direction as in the above-described embodiments.

The continuous sheet 121 on which the image has been formed passes through an inspection process (inspection apparatus) and is cut by a processing apparatus. For the inspection process and the processing process, for example, the inspection apparatus illustrated in FIG. 17 and the processing apparatus illustrated in FIG. 18 may be used, or the processing apparatus illustrated in FIG. 19 may be used.

Also in this embodiment, the eye mark detection and cutting control of the above-described embodiments can be applied.

Note that the color of the background region in the label portion 121b and the eye mark m in FIG. 22 may be a color other than white.

Eighth Embodiment

An eighth embodiment is described with reference to FIGS. 23, 24, and 25.

Figure 23:
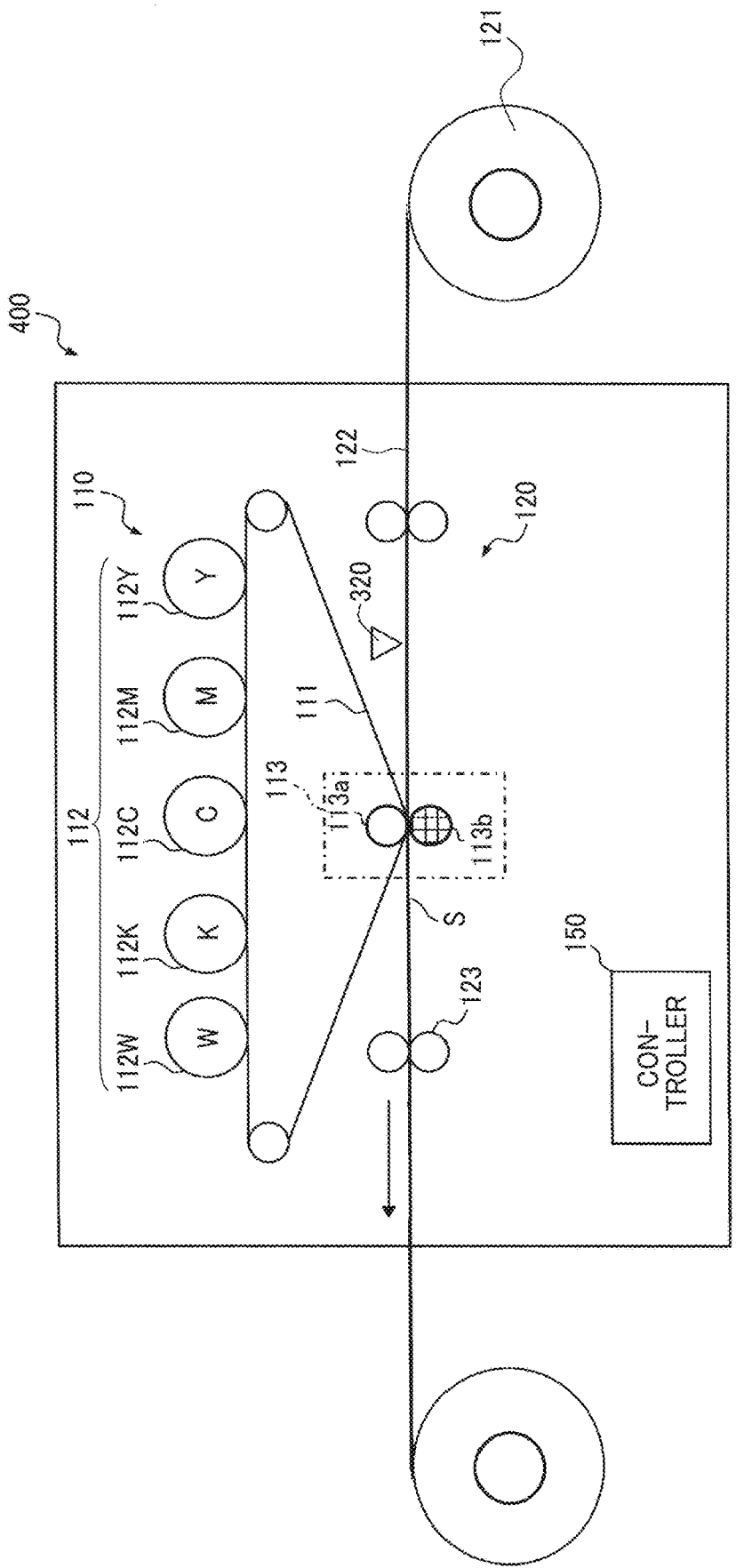
FIG. 23 is a diagram illustrating a schematic configuration of a processing apparatus according to the eighth embodiment of the present disclosure.

FIG. 23 is a diagram illustrating a schematic configuration of a processing apparatus according to the eighth embodiment.

FIG. 24 is a diagram illustrating an example of a state of a continuous sheet on which images are formed by a transfer device, according to the eighth embodiment.

FIG. 25 is a diagram illustrating an example of a state of the continuous sheet on which images are further formed on the continuous sheet of FIG. 24.

In each of the above-described embodiments, the eye mark m is used as a reference mark when the processing apparatus cuts the eye mark m. In this embodiment, the eye mark m is used as a reference mark when an image is formed on the label portion 121b.

Unlike the above-described image forming unit 110 or 110D, a processing apparatus 400 according to the present embodiment includes a mark sensor 320 and an image forming unit 110D. In the processing apparatus 400, the image forming unit 110D performs image formation based on the detection result of the mark sensor 320 to form an image on a label region of a continuous sheet 121.

The image forming unit 110D forms an image in five colors of toners including white (W) toner in addition to yellow (Y), magenta (M), cyan (C), and black (K) toners.

As illustrated in FIG. 24, the transfer device 113 transfers the background region in the label portion 121b and the eye mark m in white to the fed continuous sheet 121. The eye mark m has a circular shape and is formed only on one side of the continuous sheet 121 in the main scanning direction. The base material 121a (front surface) of the continuous sheet 121 has a color different from the color of the label portion 121b and the eye mark m. The image forming process illustrated in FIG. 24 may be performed by the image forming unit 110 illustrated in FIG. 16. The color of the background region in the label portion 121b and the eye mark m may be a color other than white. Next, after the images of the label portions 121b and the eye marks m are formed, the sheet is wound while being ejected.

Thereafter, the continuous sheet 121 is set in the inspection apparatus illustrated in FIG. 17, and the eye marks m formed as images are inspected and the continuous sheet 121 is wound up.

The continuous sheet 121 is reset in the processing apparatus 400. Each eye mark m of the fed continuous sheet 121 is detected by the mark sensor 320. Here, each of the above-described embodiments is applied to correct the result detected by the mark sensor 320 of FIG. 23, based on the result inspected by the inspection apparatus illustrated in FIG. 17. After the information of the corrected eye mark m is detected, the continuous sheet 121 is conveyed by a predetermined length (or a predetermined time). As illustrated in FIG. 25, an image (e.g., ABC in FIG. 25) is superimposed and formed on the background region of the label portion 121b.

In this manner, the transfer device 113 of the processing apparatus 400 functions as a processing device that processes the continuous sheet 121 serving as a recording medium at a predetermined position based on the detection result detected by the mark sensor 320.

After the image is formed on the region of the label portion, the continuous sheet 121 can be cut by the processing apparatus illustrated in FIG. 18, for example.

In this manner, the result detected by the mark sensor 320 in FIG. 23 is corrected, thus allowing an image to be formed at an appropriate position on each label portion 121b.

If the continuous sheet 121 to be reset on the cutting unit 300 has all the eye marks m determined to be normal by the inspection apparatus illustrated in FIG. 17, the mark sensor 320 illustrated in FIG. 23 may detect each eye mark and then convey the continuous sheet by a predetermined length (or a predetermined time) to form an image (e.g., ABC in FIG. 25) on the background region of the label portion 121b as illustrated in FIG. 25. That is, the detection result of each eye mark detected by the mark sensor 320 is not corrected.

In this embodiment, it is assumed that the eye marks and the label portions 121b are present on the same surface of the continuous sheet 121. Therefore, the inspection apparatus and the processing apparatus according to the present embodiment may be, for example, the inspection device of FIG. 17 and the processing apparatus of FIG. 18, or the processing apparatus of FIG. 19.

The continuous sheet 121 may have an adhesive surface on a back surface of the base material 121a and be bonded to the back surface 121c of the continuous sheet 121, or may not have an adhesive surface on the back surface of the base material 121a.

Ninth Embodiment

A ninth embodiment is described with reference to FIG. 26.

Figure 26:
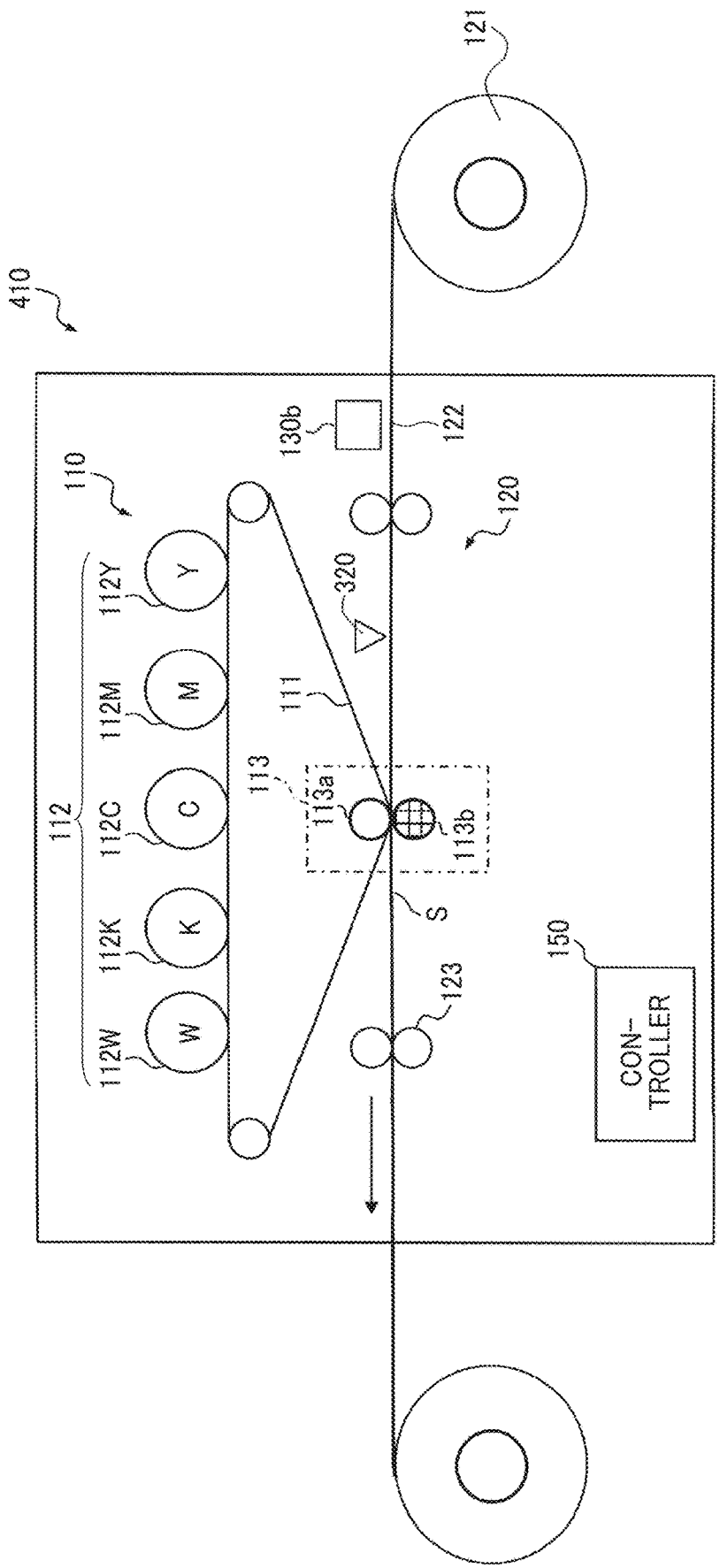
FIG. 26 is a diagram illustrating a schematic configuration of a processing apparatus according to a ninth embodiment of the present disclosure.

FIG. 26 is a diagram illustrating a schematic configuration of a processing apparatus according to the ninth embodiment.

A processing apparatus 410 according to the present embodiment includes the above-described reading device 130b in addition to the processing apparatus 400 of FIG. 23.

The processing apparatus 410 has a function example in which the reading device 130b of the image reading unit 130A illustrated in FIG. 6 is replaced with the reading device 130b.

In the processing apparatus 410 (or the image forming unit 110 or 110D), as illustrated in FIG. 24, a transfer device 113 transfers background regions of label portions 121b and eye marks m in white to a fed continuous sheet 121.

Thereafter, the continuous sheet 121 is set in the processing apparatus 410 illustrated in FIG. 26. The continuous sheet 121 is fed out, an eye mark is detected by the reading device 130b as in the eighth embodiment described above, and the presence or absence of abnormality of the eye mark m is detected.

Next, the mark sensor 320 detects each eye mark m. Then, as in the eighth embodiment described above, the result detected by the mark sensor 320 is corrected. After the information of the corrected eye mark m is detected, the continuous sheet 121 is conveyed by a predetermined length (or a predetermined time). As illustrated in FIG. 25, an image (e.g., ABC in FIG. 25) is superimposed and formed on the background region of the label portion 121b.

After the image is formed on the region of the label portion, the continuous sheet 121 can be cut by the processing apparatus illustrated in FIG. 18, for example.

In this manner, an eye mark m is inspected with the reading device 130b and the result detected by the mark sensor 320 is corrected, thus allowing an image to be formed at an appropriate position in each label portion 121b.

Tenth Embodiment

A tenth embodiment is described with reference to FIG. 27.

Figure 27:
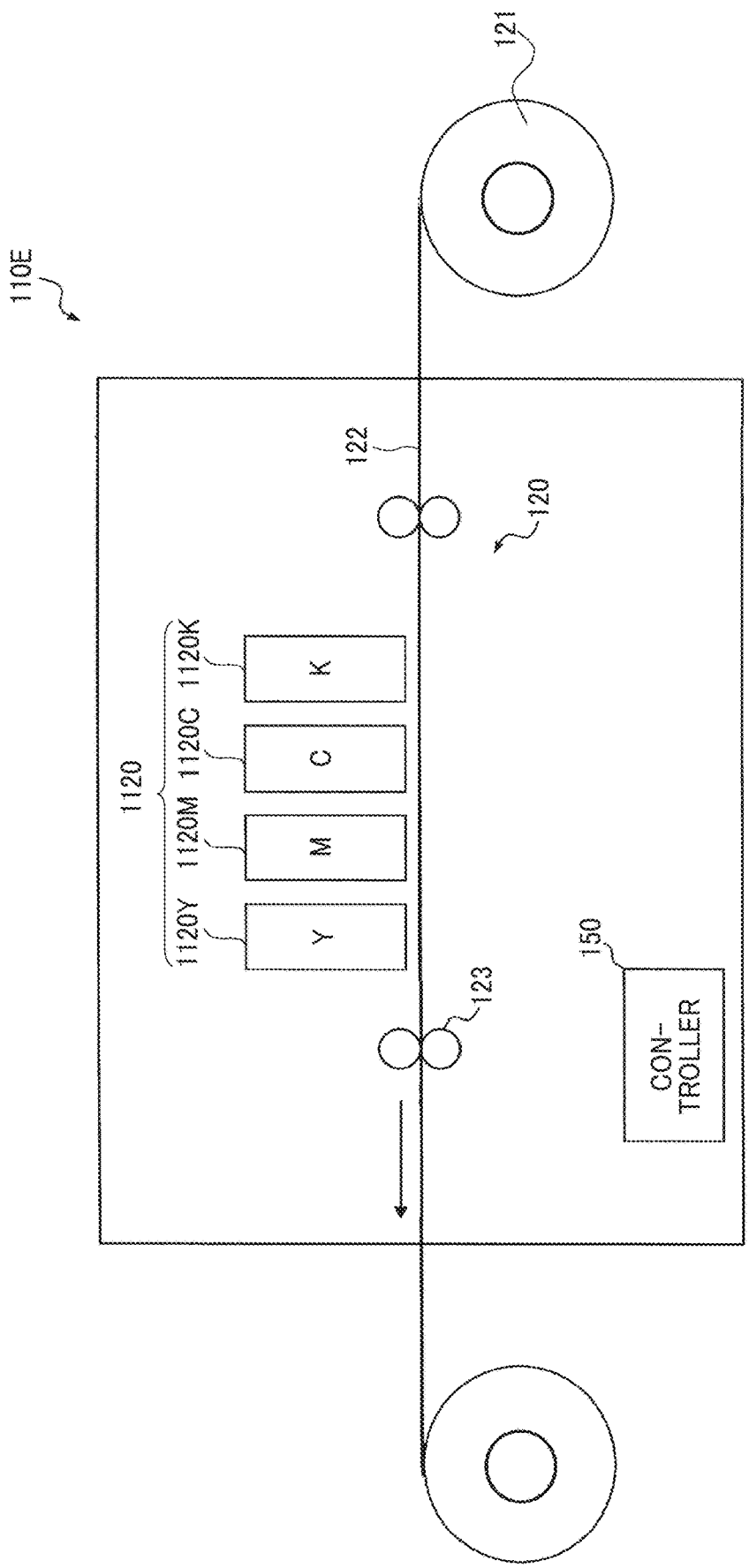
FIG. 27 is a diagram illustrating a schematic configuration of an image forming apparatus according to a tenth embodiment of the present disclosure.

FIG. 27 is a diagram illustrating a schematic configuration of an image forming apparatus according to the tenth embodiment.

In the present embodiment, an image forming unit 110E serving as an image forming apparatus is not an electrophotographic type but an inkjet recording type.

Liquid discharge heads 1120K, 1120C, 1120M, and 1120Y that discharge liquid as a printing unit 1120 print at least one of the above-described eye mark m, background region of the label portion 121b, and image on the label portion 121b.

The processing of the continuous sheet 121 printed in FIG. 27 may be performed by the inspection apparatus of FIG. 17 and the processing apparatus of FIG. 18 or by the processing apparatus of FIG. 19.

The image forming unit 110 illustrated in FIG. 1 may be used instead of the image forming unit 110E illustrated in FIG. 27.

In the image forming unit 110E according to the present embodiment, a stain of ink from the printing unit 1120 corresponds to the stain W1 of toner described with reference to FIG. 4A, and an eye mark formed with a small amount of ink from the printing unit 1120 corresponds to the light-colored eye mark illustrated in FIG. 4B. Thus, the above-described embodiments can be applied, and eye mark detection and cutting control can be applied.

The processing of each of the mark position detection unit 131, the reading controller 132, the output unit 135, the mark position storage unit 134, the mark detection unit 321, and the like described in each of the above-described embodiments can be implemented by, for example, a program. Each processing may be configured to be implemented by the controller 150 (or, e.g., an inspection controller or a processing controller). Alternatively, each processing described above may be implemented with a combination of hardware and software by using hardware such as an application specific integrated circuit (ASIC) as a part of the processing.

As described above, according to each of the above-described embodiments, an abnormality of an eye mark is detected by the reading apparatus upstream from the processing apparatus in the conveyance direction of the recording medium, a detection result of the eye mark detected by a mark sensor downstream from the reading apparatus in the conveyance direction is corrected, and processing is performed based on the corrected result. Such a configuration can prevent processing from being performed at an erroneous position due to abnormality or contamination of the eye mark or contamination near the eye mark.

Alternatively, one or more of the above-described embodiments may be appropriately combined and implemented. For example, the mark position detection unit 131 may combine a process in a case where the color of the eye mark is light and a process in a case where the continuous sheet 121 is stained.

Although some embodiments and examples of the present disclosure have been described above, embodiments of the present disclosure are not limited to the above-described embodiments and examples. Embodiments of the present disclosure can be variously modified or changed in light of the appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A reading apparatus, comprising:
a reading device configured to generate read information indicating detection of a reference image formed on a recording medium by reading the recording medium in a first direction, the first direction intersecting a second direction and the second direction being a conveyance direction of the recording medium;
a sensor configured to detect the reference image at a time after the reading device generates the read information; and
circuitry configured to
determine a corrected position of the reference image for cutting processing of the recording medium, based on the read information, and a detection result of the sensor.

2. The reading apparatus according to claim 1, wherein the circuitry is configured to output a detection result of the reference image based on the read information.

3. The reading apparatus according to claim 2, wherein the circuitry is configured to output an abnormality of the reference image as the detection result.

4. The reading apparatus according to claim 1, wherein the circuitry is configured to detect an abnormality of the reference image at a predetermined position in the first direction of the recording medium based on the read information.

5. The reading apparatus according to claim 1, wherein the circuitry is configured to:
determine whether the reference image is normal based on a plurality of threshold values; and
change the plurality of threshold values based on the read information.

6. The reading apparatus according to claim 1, wherein the reading device is configured to
determine a detection color based on a color of the recording medium and a color of the reference image, and
set the determined detection color.

7. The reading apparatus according to claim 1, wherein the circuitry is configured to determine an abnormality of the reference image in response to a read value being lower than a threshold in a position other than an expected position.

8. The reading apparatus according to claim 1, wherein the reference image includes a first mark and a second mark, the first mark and the second mark at a same position in the first direction.

9. The reading apparatus of claim 1, wherein the circuitry is configured to determine that a reference image detected in the read information is not a normal reference image in response to an interval in the second direction between the detected reference image and a previous reference image being less than an expected interval.

10. A processing apparatus, comprising:
a reading device configured to generate read information indicating detection of a reference image formed on a recording medium by reading the recording medium in a first direction, the first direction intersecting a second direction and the second direction being a conveyance direction of the recording medium;
a sensor configured to detect the reference image at a time after the reading device generates the read information; and
circuitry configured to determine a corrected position of the reference image based on the read information and a detection result of the sensor; and
a processing device configured to process the recording medium at the corrected position.

11. The processing apparatus according to claim 10, wherein the recording medium includes a plurality of reference images in the second direction, and
wherein the circuitry is configured to determine the corrected position based on a distance between the plurality of reference images in the conveyance direction.

12. The processing apparatus according to claim 10, wherein the circuitry is configured to determine whether a reference image detected by the sensor is the reference image, and
wherein the circuitry is configured to exclude the reference image detected by the sensor from a plurality of reference images detected by the sensor in response to a determination that the reference image detected by the sensor is not the reference image.

13. The processing apparatus according to claim 10, wherein the processing device is configured to form a print image different from the reference image at a position on the recording medium based on the corrected position.

14. The processing apparatus according to claim 13, wherein the processing device is downstream from the reading device in the conveyance direction, and
wherein the circuitry is configured to detect the reference image based on the read information.

15. The processing apparatus according to claim 10, wherein the processing device is configured to cut the recording medium at the corrected position.

16. The reading apparatus of claim 10, wherein the reading device includes an irradiator and a line image sensor, and
wherein the sensor is a point-type reflection sensor or a transmission sensor.

17. An image forming system, comprising:
an image forming apparatus configured to form an image on a recording medium;
a reading apparatus at a downstream side of the image forming apparatus in a first direction, the first direction being a conveyance direction of the recording medium, the reading apparatus including:
a reading device configured to generate read information indicating detection of a reference image by reading the recording medium in a second direction intersecting the first direction;
a processing apparatus at a downstream side of the reading apparatus in the first direction, the processing apparatus including:
a sensor configured to detect the reference image at a time after the reading device generates the read information; and
a processing device configured to process the recording medium at a corrected position; and
circuitry configured to determine the corrected position based on the read information and a detection result of the sensor.

18. The image forming system according to claim 17, wherein the image forming apparatus is configured to form the reference image on the recording medium.

19. The reading apparatus of claim 17, wherein the reading device is different from the sensor.

20. The image forming system according to claim 17, wherein the reading device includes an irradiator and a line image sensor, and
wherein the sensor is a point-type reflection sensor or a transmission sensor.

* * * * *